United States Patent
Talagala et al.

(10) Patent No.: US 8,671,249 B2
(45) Date of Patent: Mar. 11, 2014

(54) APPARATUS, SYSTEM, AND METHOD FOR MANAGING STORAGE CAPACITY RECOVERY

(75) Inventors: Nisha Talagala, Livermore, CA (US); James Peterson, San Jose, CA (US)

(73) Assignee: Fusion-io, Inc., Salt Lake City, UT (US)

( * ) Notice: Subject to any disclaimer, the term of this patent is extended or adjusted under 35 U.S.C. 154(b) by 214 days.

(21) Appl. No.: 13/267,811

(22) Filed: Oct. 6, 2011

(65) Prior Publication Data
US 2013/0024641 A1    Jan. 24, 2013

Related U.S. Application Data

(60) Provisional application No. 61/510,974, filed on Jul. 22, 2011.

(51) Int. Cl.
*G06F 12/00*    (2006.01)

(52) U.S. Cl.
USPC .............................. 711/154; 711/167; 710/36

(58) Field of Classification Search
USPC ..................... 711/154, 167; 710/36
See application file for complete search history.

(56) References Cited

U.S. PATENT DOCUMENTS

| | | | |
|---|---|---|---|
| 8,074,011 B2 | 12/2011 | Flynn et al. | |
| 8,195,912 B2 | 6/2012 | Flynn et al. | |
| 8,402,201 B2 | 3/2013 | Flynn et al. | |
| 2002/0065875 A1* | 5/2002 | Bracewell et al. | 709/203 |
| 2010/0299553 A1* | 11/2010 | Cen | 714/4 |
| 2011/0004722 A1* | 1/2011 | Jeddeloh | 711/103 |
| 2011/0010495 A1* | 1/2011 | Haustein et al. | 711/111 |
| 2012/0311232 A1* | 12/2012 | Porterfield | 711/103 |

* cited by examiner

*Primary Examiner* — John Lane
(74) *Attorney, Agent, or Firm* — Meyertons, Hood, Kivlin, Kowert & Goetzel, P.C.

(57) ABSTRACT

An apparatus, system, and method are disclosed for managing storage capacity recovery. A monitor module determines a workload write bandwidth for a sequential log-based data storage device. The workload write bandwidth includes a rate at which workload write operations generate reclaimable storage capacity on the data storage device. A target module determines a target reclamation write bandwidth for the data storage device. A capacity reclaim rate is associated with the target reclamation write bandwidth. The capacity reclaim rate satisfies the workload write bandwidth for the data storage device. A reclaim rate module determines a prospective reclamation write bandwidth for the data storage device, based on the workload write bandwidth, to correspond to the capacity reclaim rate associated with the target reclamation write bandwidth.

16 Claims, 11 Drawing Sheets

APPARATUS, SYSTEM, AND METHOD FOR MANAGING STORAGE CAPACITY RECOVERY

CROSS-REFERENCES TO RELATED APPLICATIONS

This application claims priority to U.S. Provisional Patent Application No. 61/510,974 entitled "APPARATUS, SYSTEM, AND METHOD FOR MANAGING STORAGE CAPACITY RECOVERY" and filed on Jul. 22, 2011 for Nisha Talagala, et al., which is incorporated herein by reference.

FIELD OF THE INVENTION

This invention relates to solid-state storage devices and more particularly relates to storage capacity recovery for solid-state storage devices.

BACKGROUND

Description of the Related Art

Typically, data stored on solid-state storage devices cannot be updated in place, but storage cells are erased before being reprogrammed with new data. Erase operations for storage cells are often slower than read and write operations. For these reasons, each new write on a solid-state storage device is typically to a fresh location and storage cells are erased before they are reused. Many other types of data storage devices, such as hard disk drives or other magnetic storage, allow blocks to be overwritten in place.

Some solid-state storage devices recover storage capacity in on/off step-function-like cycles, which run until a certain amount of free space is recovered and then stop. While storage capacity recovery is active, the latency of foreground input/output operations may increase and their performance may dramatically suffer, leading to unpredictable behavior at the application level and inconsistent performance for users. Furthermore, a solid-state storage device can typically only write to a particular storage cell a certain number of times before the particular storage cell begins to fail. Treating a solid-state storage device as a traditional random access device does not evenly distribute the writing of data over the storage cells of the solid-state storage device, which can lead to premature failure of heavily used portions of the solid-state storage device.

BRIEF SUMMARY

From the foregoing discussion, it should be apparent that a need exists for an apparatus, system, and method for managing storage capacity recovery. Beneficially, such an apparatus, system, and method would manage storage capacity recovery to provide consistent performance and to maintain or extend the usable life of solid-state storage media.

The present invention has been developed in response to the present state of the art, and in particular, in response to the problems and needs in the art that have not yet been fully solved by current solid-state storage devices. Accordingly, the present invention has been developed to provide an apparatus, system, and method for storage capacity recovery that overcome many or all of the above-discussed shortcomings in the art.

A method of the present invention is presented for managing storage capacity recovery. In one embodiment, the method includes determining a write bandwidth for a sequential log-based data storage device. The write bandwidth may include a rate at which workload write operations use reclaimable storage capacity on the data storage device. In a further embodiment, the method includes determining a target capacity reclaim rate for the data storage device. The target capacity reclaim rate may satisfy the write bandwidth for the data storage device. In one embodiment, the method includes determining a prospective capacity reclaim rate for the data storage device, based on the write bandwidth, to correspond to the target capacity reclaim rate.

Determining the target capacity reclaim rate for the data storage device, in one embodiment, includes determining an adjustment to a past capacity reclaim rate for the data storage device in a direction of the target capacity reclaim rate. In one embodiment, the method includes redetermining the write bandwidth for the data storage device. In one embodiment, the method includes redetermining the prospective capacity reclaim rate for the data storage device. In an additional embodiment, the method includes determining a past capacity reclaim rate for the data storage device. The past capacity reclaim rate may include a rate at which reclaimable storage capacity is reclaimed during one or more previous reclamation periods. In one embodiment, the method includes adjusting the prospective capacity reclaim rate for the data storage device in response to the determined past capacity reclaim rate failing to satisfy the write bandwidth.

In one embodiment, the target capacity reclaim rate satisfies the write bandwidth for the data storage device by being greater than or equal to the write bandwidth in response to a used user capacity for the data storage device reaching a maximum user capacity for the data storage device. In certain embodiments, the target capacity reclaim rate includes a target reclamation write rate determined using the write bandwidth and an invalid data ratio for one or more reclamation regions of the data storage device. The target reclamation write rate, in a further embodiment, may be determined by multiplying the write bandwidth by one minus the invalid data ratio divided by the invalid data ratio.

In one embodiment, the method includes halting workload writes temporarily in response to the target capacity reclaim rate exceeding a reclaim rate threshold. In a further embodiment, the method includes halting workload writes temporarily in response to a remaining storage capacity of the data storage device satisfying a panic threshold.

In one embodiment, the method includes suspending a capacity reclamation operation associated with the prospective capacity reclaim rate in response to a remaining storage capacity of the data storage device satisfying a high capacity threshold. In certain embodiments, the method includes scaling a magnitude of the determined target capacity reclaim rate based on a remaining storage capacity of the data storage device.

In one embodiment, the write bandwidth includes a feedback input for determining the target capacity reclaim rate. In certain embodiments, the target capacity reclaim rate is determined using a proportional feedback control, an integral feedback control, and/or a derivative feedback control.

In one embodiment, determining the prospective capacity reclaim rate includes determining a frequency at which a capacity reclamation operation reclaims storage capacity of the data storage device, determining a number of reclamation regions that the capacity reclamation operation reclaims during a reclamation period, and/or determining a size of a buffer associated with the capacity reclamation operation.

In one embodiment, a sequential log-based writing structure of the data storage device includes an append point and workload data and capacity reclamation data are both written to the append point such that workload data and capacity reclamation data are not written simultaneously.

An apparatus for managing storage capacity recovery is provided with a plurality of modules configured to functionally execute the steps of managing storage capacity recovery. These modules in the described embodiments include a monitor module, a target module, a reclaim rate module, a capacity panic module, and a sleep module.

In one embodiment, the monitor module determines a workload write bandwidth for a sequential log-based data storage device. The workload write bandwidth may include a rate at which workload write operations generate reclaimable storage capacity on the data storage device. In one embodiment, the target module determines a target reclamation write bandwidth for the data storage device. A capacity reclaim rate may be associated with the target reclamation write bandwidth satisfying the workload write bandwidth for the data storage device. In one embodiment, the reclaim rate module determines a prospective reclamation write bandwidth for the data storage device, based on the workload write bandwidth, to correspond to the capacity reclaim rate associated with the target reclamation write bandwidth.

In one embodiment, the monitor module redetermines the workload write bandwidth for the data storage device. In a further embodiment, the reclaim rate module redetermines the prospective reclamation write bandwidth for the data storage device.

In one embodiment, the monitor module determines a past capacity reclaim rate for the data storage device. The past capacity reclaim rate may include a rate at which reclaimable storage capacity is reclaimed during one or more previous reclamation periods. The reclaim rate module, in one embodiment, adjusts the prospective reclamation write bandwidth for the data storage device in response to the determined past capacity reclaim rate failing to satisfy the workload write bandwidth.

In one embodiment, the capacity panic module temporarily halts workload writes of the workload write bandwidth in response to the capacity reclaim rate exceeding a reclaim rate threshold and/or a remaining storage capacity of the data storage device satisfying a panic threshold. In one embodiment, the sleep module suspends a capacity reclamation operation associated with the prospective reclamation write bandwidth in response to a remaining storage capacity of the data storage device satisfying a high capacity threshold.

A system of the present invention is also presented to manage storage capacity recovery. The system may be embodied by a sequential log-based data storage device, a monitor module, a target module, and a reclaim rate module. The system, in certain embodiments, includes a host device in communication with the data storage device. The monitor module, the target module, and the reclaim rate module, in one embodiment, are substantially similar to those described above with regard to the presented apparatus.

In one embodiment, the monitor module determines a workload write bandwidth for the data storage device. The workload write bandwidth may include a rate at which workload write operations generate reclaimable storage capacity on the data storage device. In one embodiment, the target module determines a target reclamation write bandwidth for the data storage device. A capacity reclaim rate may be associated with the target reclamation write bandwidth satisfying the workload write bandwidth for the data storage device. In one embodiment, the reclaim rate module determines a prospective reclamation write bandwidth for the data storage device, based on the workload write bandwidth, to correspond to the capacity reclaim rate associated with the target reclamation write bandwidth.

In one embodiment, the monitor module redetermines the workload write bandwidth for the data storage device. The reclaim rate module, in one embodiment, redetermines the prospective reclamation write bandwidth for the data storage device.

In one embodiment, the monitor module determines a past capacity reclaim rate for the data storage device. The past capacity reclaim rate may include a rate at which reclaimable storage capacity is reclaimed during one or more previous reclamation periods. In one embodiment, the reclaim rate module adjusts the prospective reclamation write bandwidth for the data storage device in response to the determined past capacity reclaim rate failing to satisfy the workload write bandwidth.

In one embodiment, the system includes a host device in communication with the data storage device. In one embodiment, at least a portion of the monitor module, the target module, and/or the reclaim rate module is part of a device driver installed on the host device for the data storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
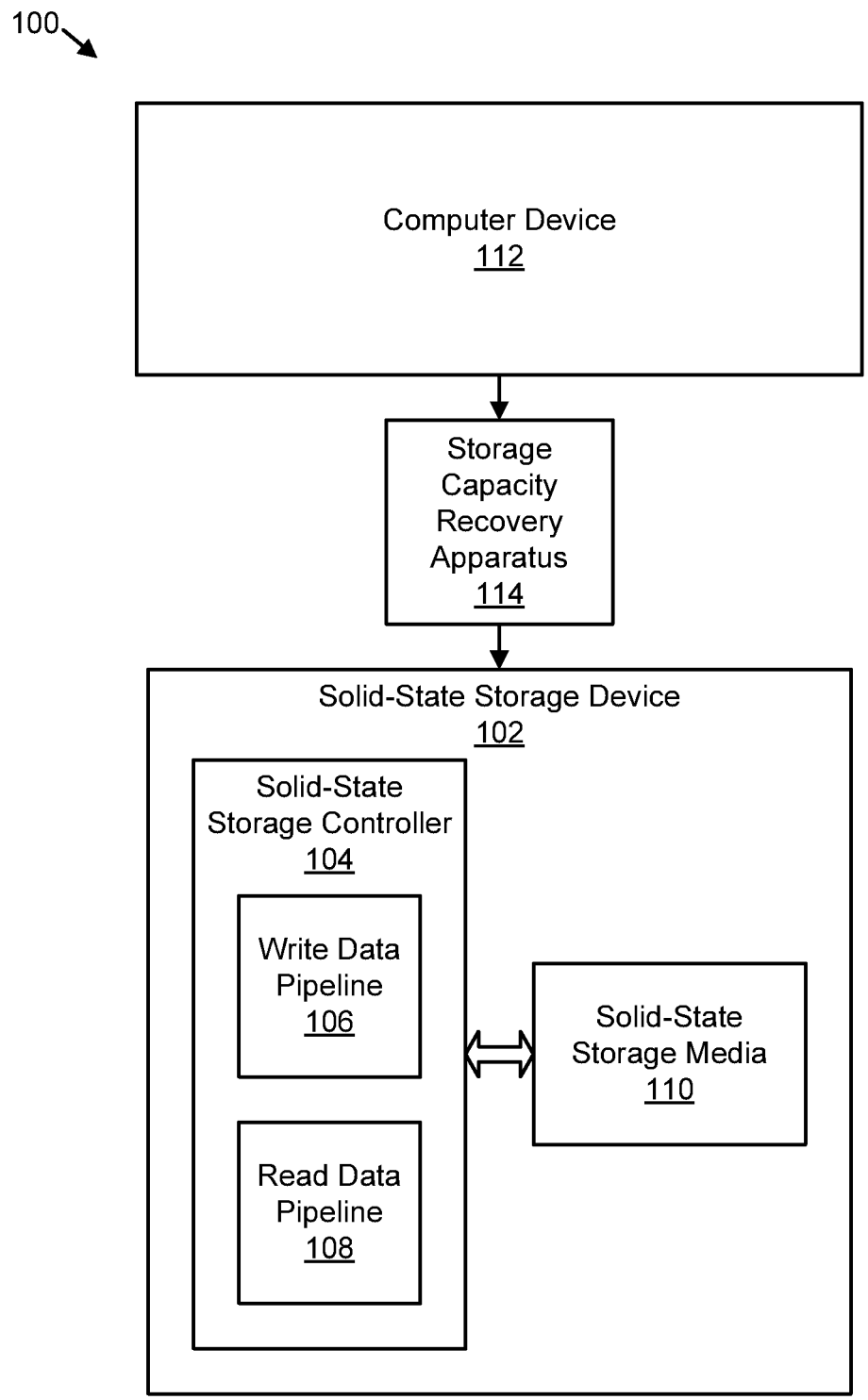
FIG. 1 is a schematic block diagram illustrating one embodiment of a system for managing storage capacity recovery in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Solid-State Storage System

FIG. 1 is a schematic block diagram illustrating one embodiment of a system 100 for data management in a solid-state storage device in accordance with the present invention. The system 100 includes a solid-state storage device 102, a solid-state storage controller 104, a write data pipeline 106, a read data pipeline 108, a solid-state storage media 110, a computer 112, and a storage capacity recovery apparatus 114, which are described below.

The system 100 includes at least one solid-state storage device 102. In another embodiment, the system 100 includes two or more solid-state storage devices 102. Each solid-state storage device 102 may include non-volatile, solid-state storage 110, such as flash memory, nano random access memory ("nano RAM or NRAM"), magneto-resistive RAM ("MRAM"), dynamic RAM ("DRAM"), phase change RAM ("PRAM"), racetrack memory, memristor memory, nanocrystal wire-based memory, silicon-oxide based sub-10 nanometer process memory, graphene memory, silicon-oxide-nitride-oxide-silicon ("SONOS") memory, resistive random-access memory ("RRAM"), programmable metallization cell ("PMC"), conductive-bridging RAM ("CBRAM"), or the like. In certain embodiments, the solid-state storage device 102 is a sequential log-based data storage device that stores data in one or more append-only log-based writing structures of the solid-state storage media 110. The solid-state storage device 102 is described in more detail with respect to FIGS. 2 and 3.

The solid-state storage device 102 is in communication with a computer device 112, which may act as a host device for the solid-state storage device 102. In the depicted embodiment, the system 100 includes a storage capacity recovery apparatus 114. The storage capacity recovery apparatus 114 recovers storage capacity of the solid-state storage media 110 as data is invalidated by subsequent writes to the solid-state storage device 102. The storage capacity recovery apparatus 114, in various embodiments, may be part of the solid-state storage controller 104, part of a device driver for the solid-state storage device 102 installed on the computer device 112, or both. The storage capacity recovery apparatus 114 is described in more detail with respect to FIG. 5.

In one embodiment, the solid-state storage device 102 is internal to the computer device 112 and is connected using a system bus, such as a peripheral component interconnect express ("PCI-e") bus, a Serial Advanced Technology Attachment ("serial ATA") bus, or the like. In another embodiment, the solid-state storage device 102 is external to the computer device 112 and is connected, a universal serial bus ("USB") connection, an Institute of Electrical and Electronics Engineers ("IEEE") 1394 bus ("FireWire"), or the like. In other embodiments, the solid-state storage device 102 is connected to the computer device 112 using a peripheral component interconnect ("PCI") express bus using external electrical or optical bus extension or bus networking solution such as Infiniband or PCI Express Advanced Switching ("PCIe-AS"), or the like.

In various embodiments, the solid-state storage device 102 may be in the form of a dual-inline memory module ("DIMM"), a daughter card, or a micro-module. In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104. A solid-state storage controller 104 may include a write data pipeline 106 and a read data pipeline 108. Each solid-state storage controller 104 is in communication with and manages solid-state storage media 110. The solid-state storage controller 104, the write data pipeline 106, the read data pipeline 108, and the solid-state storage media 110 are described in more detail below with respect to FIGS. 2 and 3.

The system 100 includes one or more computer devices 112 connected to the solid-state storage device 102. A computer device 112 may be a host device, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer device 112 may be a client and the solid-state storage device 102 operates autonomously to service data requests sent from the computer device 112. In this embodiment, the computer device 112 and solid-state storage device 102 may be connected using a computer network, system bus, or other communication means suitable for connection between a computer device 112 and an autonomous solid-state storage device 102.

In one embodiment, the system 100 includes one or more clients connected to one or more computer devices 112 through one or more computer networks. A client may be a host device, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network may also include a network from the IEEE 802 family of network technologies, such Ethernet, token ring, WiFi, WiMax, and the like.

The computer network may include servers, switches, routers, cabling, radios, and other equipment used to facilitate networking computer devices 112 and clients. In one embodiment, the system 100 includes multiple computer devices 112 that communicate as peers over a computer network. In another embodiment, the system 100 includes multiple solid-state storage devices 102 that communicate as peers over a computer network. One of skill in the art, in light of this disclosure, will recognize other computer networks comprising one or more computer networks and related equipment with single or redundant connection between one or more clients or other computer devices 112 with one or more solid-state storage devices 102. In one embodiment, the system 100 includes two or more solid-state storage devices 102 connected through a computer network to a client without a computer device 112.

Solid-State Storage Device

Figure 2:
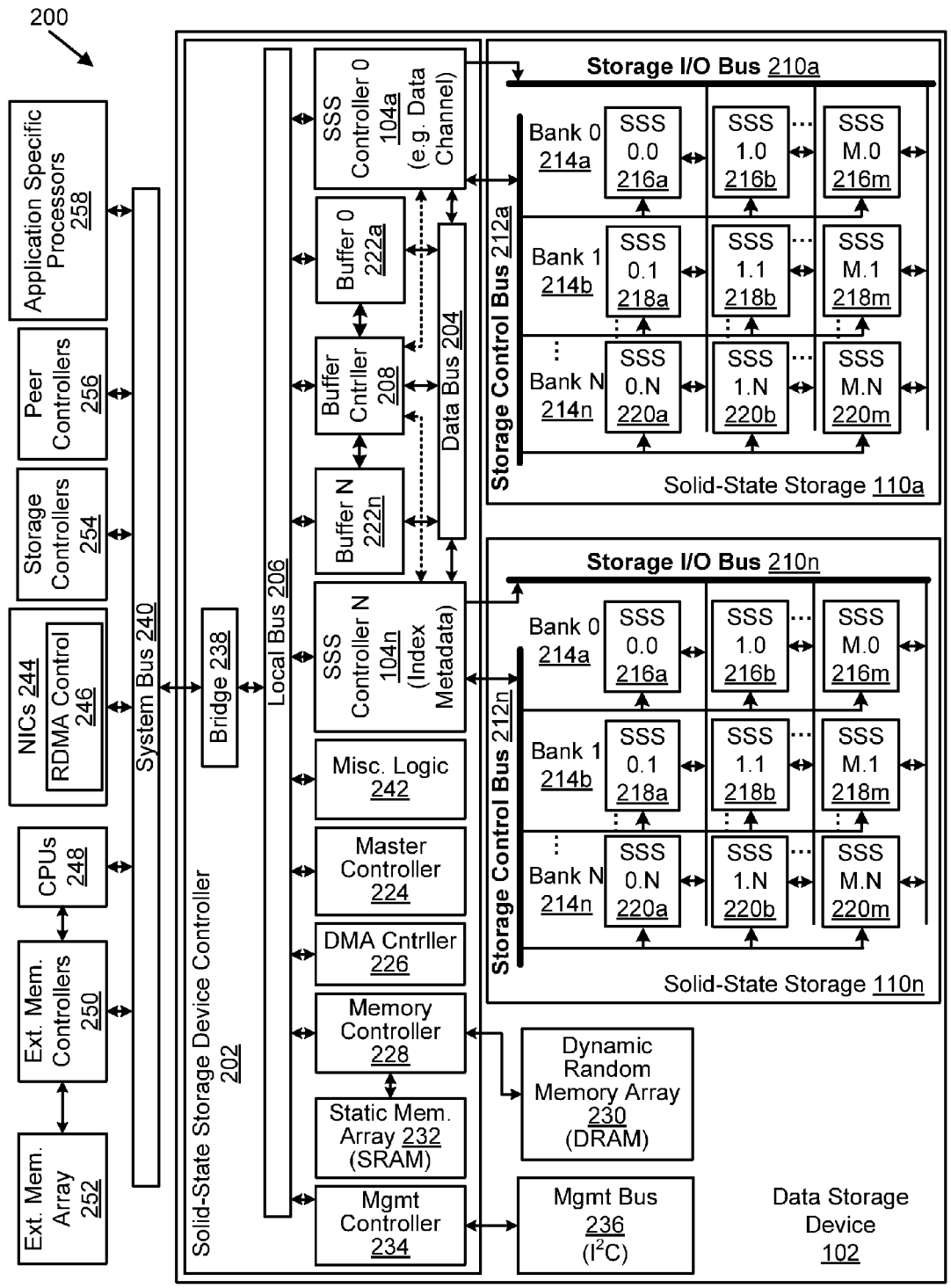
FIG. 2 is a schematic block diagram illustrating one embodiment of a solid-state storage device controller in a solid-state storage device in accordance with the present invention.

FIG. 2 is a schematic block diagram illustrating one embodiment 200 of a solid-state storage device controller 202 that includes a write data pipeline 106 and a read data pipeline 108 in a solid-state storage device 102 in accordance with the present invention. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. Of course different embodiments may include different values for n and m. In one embodiment, a solid-state storage media 110a includes twenty solid-state storage elements 216, 218, 220 per bank 214 with eight banks 214. In one embodiment, the solid-state storage media 110a includes twenty four solid-state storage elements 216, 218, 220 per bank 214 with eight banks 214. In addition to the n×m storage elements 216, 218, 220, one or more additional columns (P) may also be addressed and operated in parallel with other solid-state storage elements 216a, 216b, 216m for one or more rows. The added P columns in one embodiment, store parity data for the portions of an ECC chunk (i.e. an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common storage I/O bus 210a (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 8.0) 216a-220a, each in a separate bank 214a-n. In another embodiment, 24 storage elements (e.g. SSS 0.0-SSS 0.24) 216 form a logical bank 214a so that each of the eight logical banks has 24 storage elements (e.g. SSS0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g. Bank 0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2000 bytes ("2 kB"). In one example, a solid-state storage element (e.g. SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the channels of the storage I/O bus 210.

This group of pages in a bank 214 of solid-state storage elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, wherein the packet is intended to be written to a location within a particular page which is specific to a particular physical erase block of a particular storage element of a particular bank, a physical address is sent on the storage I/O bus 210 and followed by the packet. The physical address contains enough information for the solid-state storage element 216, 218, 220 to direct the packet to the designated location within the page. Since all storage elements in a column of storage elements (e.g. SSS 0.0-SSS N.0 216a, 218a, 220a) are accessed simultaneously by the appropriate bus within the storage I/O bus 210a.a, to reach the proper page and to avoid writing the data packet to similarly addressed pages in the column of storage elements (SSS 0.0-SSS N.0 216a, 218a, 220a), the bank 214a that includes the solid-state storage element SSS 0.0 216a with the correct page where the data packet is to be written is simultaneously selected by the storage control bus 212.

Similarly, satisfying a read command on the storage I/O bus 210 requires a simultaneous signal on the storage control bus 212 to select a single bank 214a and the appropriate page within that bank 214a. In one embodiment, a read command reads an entire page, and because there are multiple solid-state storage elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. Bank 0 214a) is selected over the storage control bus 212 to prevent erasure of similarly addressed erase blocks in all of the banks (Banks 1-N 214b-n). Alternatively, no particular bank (e.g. Bank 0 214a) is selected over the storage control bus 212 to enable erasure of similarly addressed erase blocks in all of the banks (Banks 1-N 214b-n) simultaneously. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g. 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, a new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art, in light of this disclosure, will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer device 112 or may be other devices.

Typically the solid-state storage controller(s) 104 communicate data to the solid-state storage media 110 over a storage I/O bus 210. In a typical embodiment where the solid-state storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g. 216a, 218a, 220a) may include a logical-to-physical mapping for storage divisions (e.g. erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device, such as a computer device 112, through the system bus 240, bridge 238, local bus 206, buffer(s) 222, and finally over a data bus 204. The data bus 204 typically is connected to one or more buffers 222*a-n* controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104*a*-104*n*-1 and associated solid-state storage media 110*a*-110*n*-1 while at least one channel (solid-state storage controller 104*n*, solid-state storage media 110*n*) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a computer device 112 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110*a-n*, the master controller 224 divides the work load among internal controllers, such as the solid-state storage controllers 104*a-n*. For example, the master controller 224 may divide an object to be written to the data storage devices (e.g. solid-state storage media 110*a-n*) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a computer device 112 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the computer device 112, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a computer device 112 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple logical devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
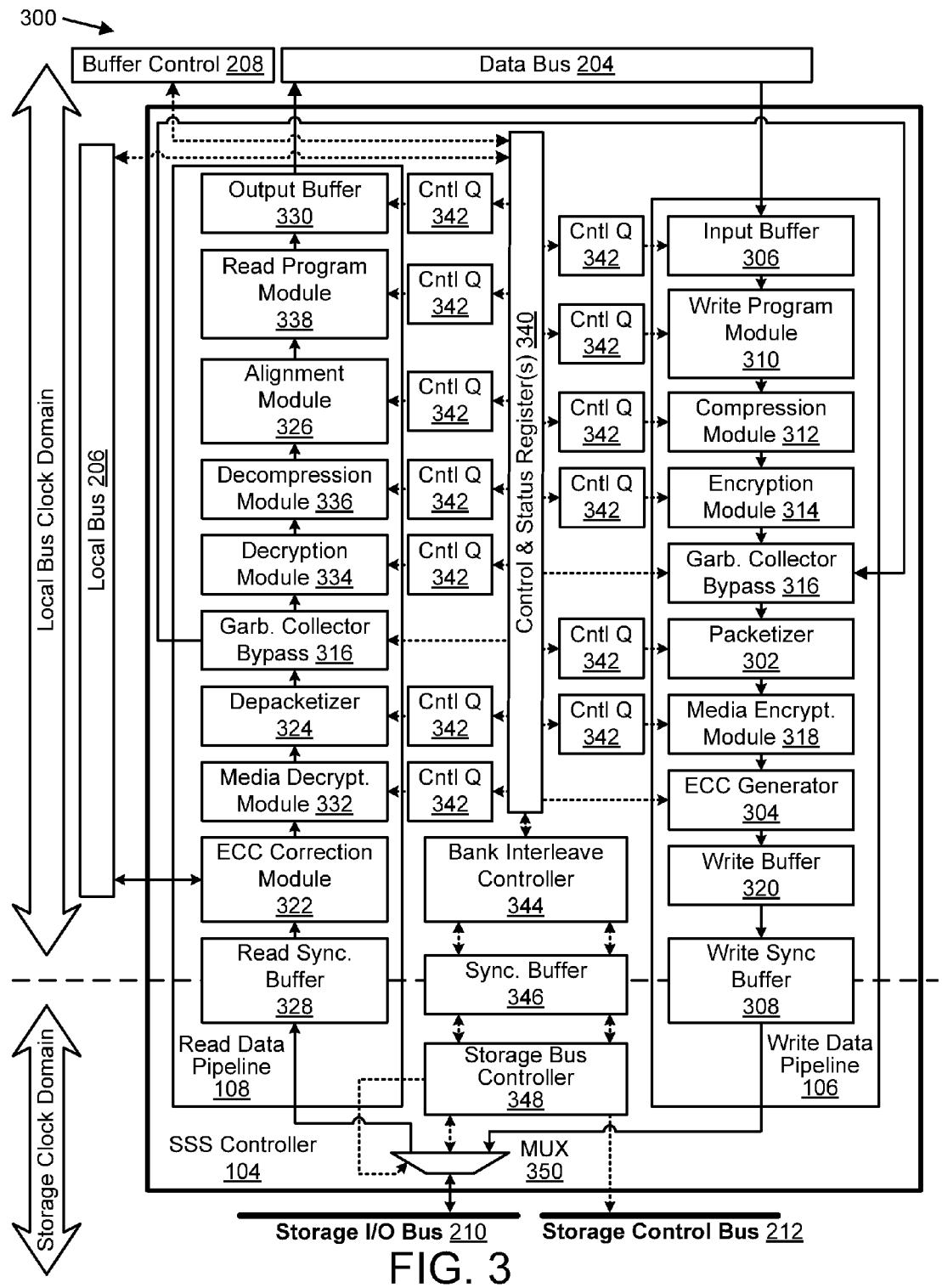
FIG. 3 is a schematic block diagram illustrating one embodiment of a solid-state storage controller with a write data pipeline and a read data pipeline in a solid-state storage device in accordance with the present invention.

FIG. 3 is a schematic block diagram illustrating one embodiment 300 of a solid-state storage controller 104 with a write data pipeline 106 and a read data pipeline 108 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below.

In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the computer device 112, or other computer or device and is transmitted to the solid-state storage device 102 in data segments streamed to the solid-state storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicates the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the ECC algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the computer device 112, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synchronization buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a computer device 112, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a computer device 112, another computer, key manager, or other device that holds the encryption key to be used to encrypt the data segment. In one embodiment, encryption keys are transferred to the solid-state storage controller 104 from one of a solid-state storage device 102, computer device 112, computer, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device or related key manager independently manages encryption keys used to encrypt only the data structures or data segments sent by the requesting device.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or computer device 112, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that computer device 112 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by computer device 112 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device, such as a computer device 112, may correct the ECC block or replace the data using another copy, such as a backup or mirror copy, and then may use the replacement data of the requested data packet or return it to the read data pipeline 108. The requesting device may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device and joined to form a response. For example, data from a portion of a first data packet may be combined with data from a portion of a second data packet. If a data segment is larger than a data requested by the requesting device, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device. The output buffer 330 accounts for differences between when data segments are received from stages of the read data pipeline 108 and when the data segments are transmitted to other parts of the solid-state storage controller 104 or to the requesting device. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a computer device 112, a client, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
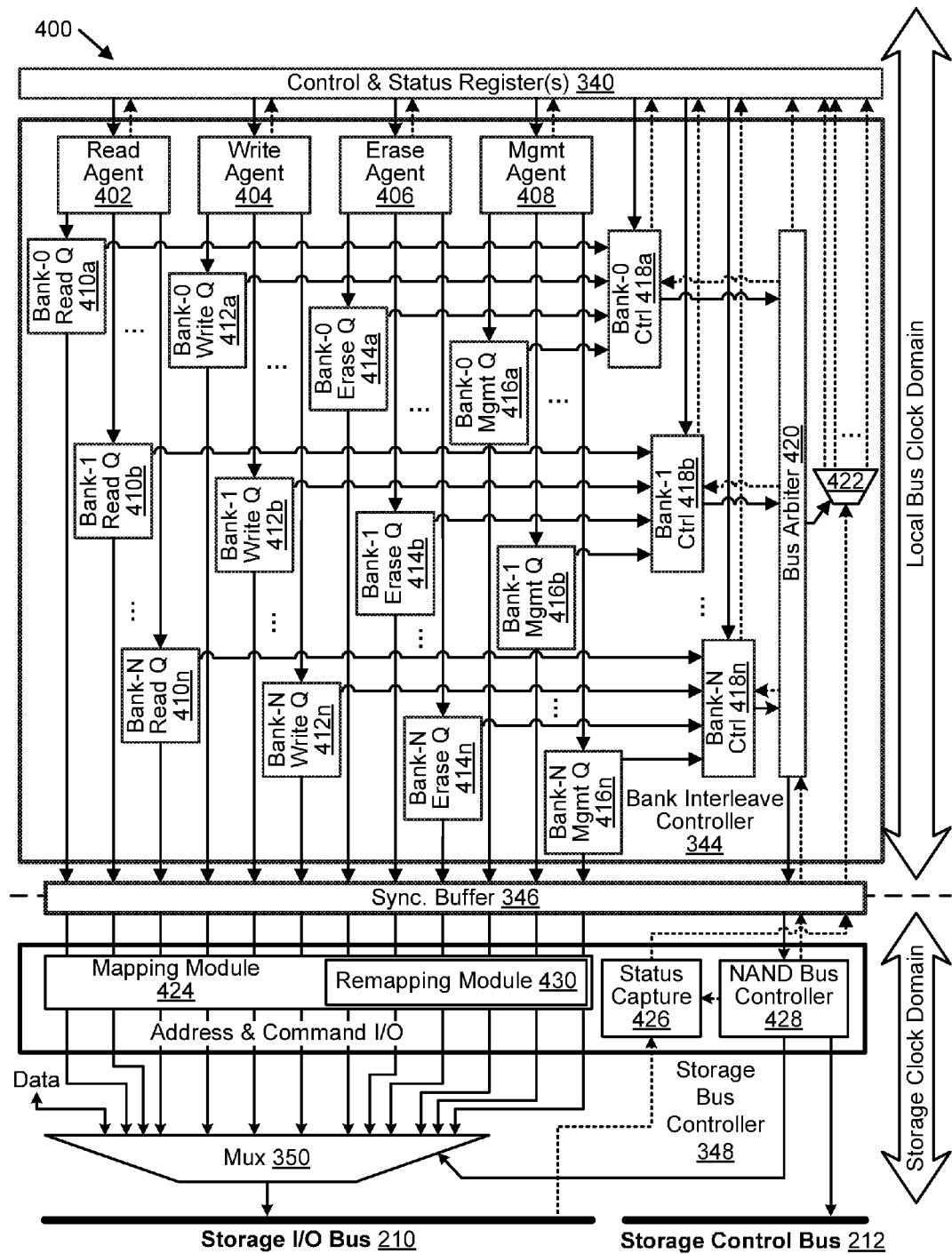
FIG. 4 is a schematic block diagram illustrating one embodiment of a bank interleave controller in the solid-state storage controller in accordance with the present invention.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write synchronization buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While Bank 0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS N.0 216a, 218a, ... 220a, a second bank interleave controller 344 serves a second column of storage elements SSS 0.1-SSS N.1 216b, 218b, ... 220b etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g. SSS 0.0 216a, SSS 1.0 218a, SSS N.0 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS 0.M 216) per bank 214a may have a logical address for a particular erase block mapped to twenty physical addresses of the erase block, one physical address per storage element. Because the storage elements are accessed in parallel, erase blocks at the same position in each storage element in a column of storage elements 216a, 218a, 220a will share a physical address. To select one erase block (e.g. in storage element SSS 0.0 216a) instead of all erase blocks in the row (e.g. in storage elements SSS 0.0, 1.0, ... N.0 216a, 218a, 220a), one bank (in this case Bank 0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 0.1 216b, . . . , and to storage element 0.M 216m, virtual erase block 2 may be mapped to erase block 2 of storage element SSS 1.0 218a, to erase block 2 of storage element SSS 1.1 218b, . . . , and to storage element 1.M 218m, etc. Alternatively, virtual erase block 1 may be mapped to one erase block from each storage element in an array such that virtual erase block 1 includes erase block 1 of storage element SSS 0.0 216a to erase block 1 of storage element SSS 0.1 216b to storage element 0.M 216m, and erase block 1 of storage element SSS 1.0 218a to erase block 1 of storage element SSS 1.1 218b, . . . , and to storage element 1.M 218m, for each storage element in the array up to erase block 1 of storage element N.M 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 0.1 216b, erase block 1 of storage element SSS 0.2 (not shown) . . . , and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Storage Space Recovery

Figure 5:
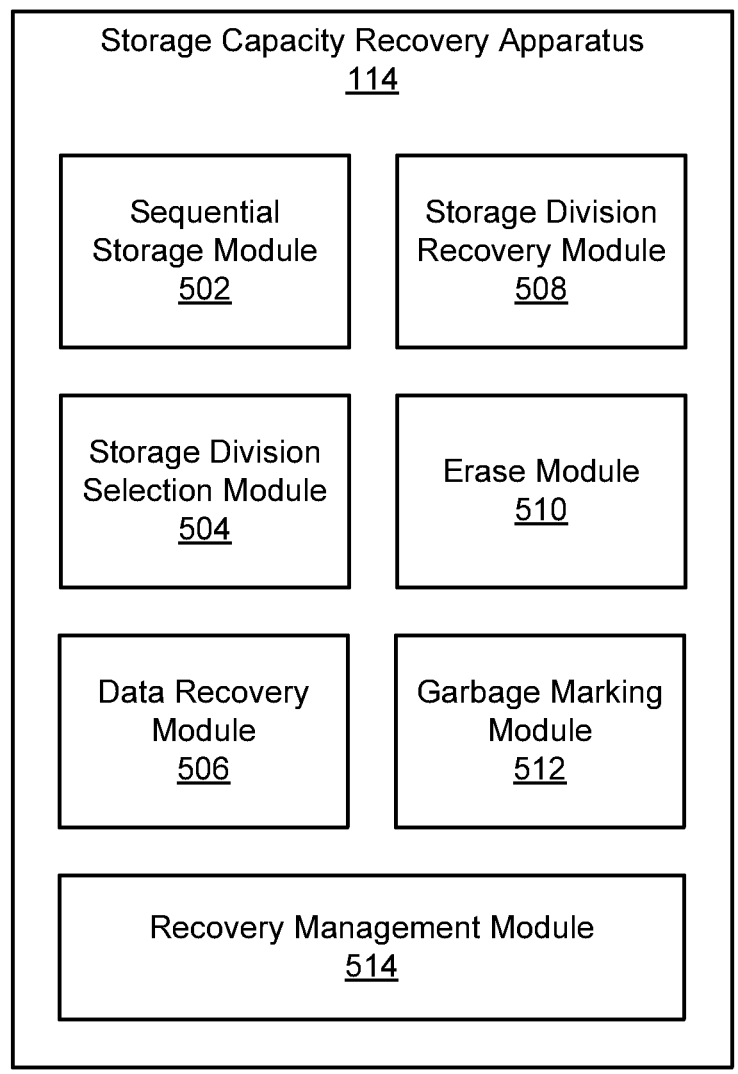
FIG. 5 is a schematic block diagram illustrating one embodiment of a storage capacity recovery apparatus in accordance with the present invention.

FIG. 5 depicts one embodiment of a storage capacity recovery apparatus 114 for a solid-state storage device 102. The storage capacity recovery apparatus 114 includes a sequential storage module 502, a storage division selection module 504, a data recovery module 506, and a storage division recovery module 508, which are described below. In other embodiments, the apparatus 114 includes an erase module 510, a garbage marking module 512, and a recovery management module 514.

The storage capacity recovery apparatus 114 includes a sequential storage module 502 that sequentially writes data packets in a page within a storage division. The packets are sequentially stored whether they are new packets or modified packets. Modified packets in this embodiment are typically not written back to a location where they were previously stored. In one embodiment, the sequential storage module 502 writes a packet to a first location in a page of a storage division, then to the next location in the page, and to the next, and the next, until the page is filled. The sequential storage module 502 then starts to fill the next page in the storage division. This continues until the storage division is filled.

In a preferred embodiment, the sequential storage module 502 starts writing packets to storage write buffers in the storage elements (e.g. SSS 0.0 to SSS 0.M 216) of a bank (Bank 0 214a). When the storage write buffers are full, the solid-state storage controller 104 causes the data in the storage write buffers to be programmed into designated pages within the storage elements 216 of the bank 214a. Then another bank (e.g. Bank 1 214b) is selected and the sequential storage module 502 starts writing packets to storage write buffers of the storage elements 218 of the bank 214b while the first Bank 0 is programming the designated pages. When the storage write buffers of this bank 214b are full, the contents of the storage write buffers are programmed into another designated page in each storage element 218. This process is efficient because while one bank 214a is programming a page, storage write buffers of another bank 214b can be filling.

The storage division includes a portion of a solid-state storage media 110 in a solid-state storage device 102. Typically the storage division is an erase block. For flash memory, an erase operation on an erase block writes ones to every bit in the erase block by charging each cell. This is a lengthy process compared to a program operation which starts with a location being all ones, and as data is written, some bits are changed to zero by discharging the cells written with a zero. However, where the solid-state storage media 110 is not flash memory or has flash memory where an erase cycle takes a similar amount of time as other operations, such as a read or a program, the storage division may not be required to be erased.

As used herein, a storage division is equivalent in area to an erase block but may or may not be erased. Where erase block is used herein, an erase block may refer to a particular area of a designated size within a storage element (e.g. SSS 0.0 216a) and typically includes a certain quantity of pages. Where "erase block" is used in conjunction with flash memory, it is typically a storage division that is erased prior to being written. Where "erase block" is used with "solid-state storage," it may or may not be erased. As used herein, an erase block may include one erase block or a group of erase blocks with one erase block in each of a row of storage elements (e.g. SSS 0.0 to SSS 0.M 216a-m), which may also be referred to herein as a virtual erase block. When referring to the logical construct associated with the virtual erase block, the erase blocks may be referred to herein as a logical erase block ("LEB").

Typically, the packets are sequentially stored by order of processing. In one embodiment, where a write data pipeline 106 is used, the sequential storage module 502 stores packets in the order that they come out of the write data pipeline 106. This order may be a result of data segments arriving from a computer device 112 or other requesting device mixed with packets of valid data that are being read from another storage division as valid data is being recovered from a storage division during a recovery operation as explained below. Re-routing recovered, valid data packets to the write data pipeline 106 may include the garbage collector bypass 316 as described above in relation to the solid-state storage controller 104 of FIG. 3.

The storage capacity recovery apparatus 114 includes a storage division selection module 504 that selects a storage division for recovery. Selecting a storage division for recovery may be to reuse the storage division by the sequential storage module 502 for writing data, thus adding the recovered storage division to the storage pool, or to recover valid data from the storage division after determining that the storage division is failing, unreliable, should be refreshed, or other reason to take the storage division temporarily or permanently out of the storage pool. In another embodiment, the storage division selection module 504 selects a storage division for recovery by identifying a storage division or erase block with a high amount of invalid data.

In another embodiment, the storage division selection module 504 selects a storage division for recovery by identifying a storage division or erase block with a low amount of wear. For example, identifying a storage division or erase block with a low amount of wear may include identifying a storage division with a low amount of invalid data, a low number of erase cycles, low bit error rate, or low program count (low number of times a page of data in a buffer is written to a page in the storage division; program count may be measured from when the solid-state storage device 102 was manufactured, from when the storage division was last erased, from other arbitrary events, and from combinations of these). The storage division selection module 504 may also use any combination of the above or other parameters to determine a storage division with a low amount of wear. Selecting a storage division for recovery by determining a storage division with a low amount of wear may be desirable to find storage divisions that are under used, may be recovered for wear leveling, etc.

In another embodiment, the storage division selection module 504 selects a storage division for recovery by identifying a storage division or erase block with a high amount of wear. For example, identifying a storage division or erase block with a high amount of wear may include identifying a storage division with a high number of erase cycles, high bit error rate, a storage division with a non-recoverable ECC block, or high program count. The storage division selection module 504 may also use any combination of the above or other parameters to determine a storage division with a high amount of wear. Selecting a storage division for recovery by determining a storage division with a high amount of wear may be desirable to find storage divisions that are over used, may be recovered by refreshing the storage division using an erase cycle, etc. or to retire the storage division from service as being unusable.

The storage capacity recovery apparatus 114 includes a data recovery module 506 that reads valid data packets from the storage division selected for recovery, queues the valid data packets with other data packets to be written sequentially by the sequential storage module 502, and updates an index with a new physical address of the valid data written by the sequential storage module 502. Typically, the index is the object index mapping data object identifiers of objects to physical addresses of where packets derived from the data object are stored in the solid-state storage media 110.

In one embodiment the storage capacity recovery apparatus 114 includes a storage division recovery module 508 that prepares the storage division for use or reuse and marks the storage division as available to the sequential storage module 502 for sequentially writing data packets after the data recovery module 506 has completed copying valid data from the storage division. In another embodiment, the storage capacity recovery apparatus 114 includes a storage division recovery module 508 that marks the storage division selected for recovery as unavailable for storing data. Typically this is due to the storage division selection module 504 identifying a storage division or erase block with a high amount of wear such that the storage division or erase block is not in condition to be used for reliable data storage.

In one embodiment, the storage capacity recovery apparatus 114 is in a solid-state storage device controller 202 of a solid-state storage device 102. In another embodiment, the storage capacity recovery apparatus 114 controls a solid-state storage device controller 202. In another embodiment, a portion of the storage capacity recovery apparatus 114 is in a solid-state storage device controller 202. In another embodiment, the object index updated by the data recovery module 506 is also located in the solid-state storage device controller 202

In one embodiment, the storage division is an erase block and the storage capacity recovery apparatus 114 includes an erase module 510 that erases an erase block selected for recovery after the data recovery module 506 has copied valid data packets from the selected erase block and before the storage division recovery module 508 marks the erase block as available. For flash memory and other solid-state storage with an erase operation taking much longer than read or write operations, erasing a data block prior to making it available for writing new data is desirable for efficient operation. Where the solid-state storage media 110 is arranged in banks 214, the erase operation by the erase module 510 may be executed on one bank while other banks are executing reads, writes, or other operations.

In one embodiment, the storage capacity recovery apparatus 114 includes a garbage marking module 512 that identifies a data packet in a storage division as invalid in response to an operation indicating that the data packet is no longer valid. For example, if a data packet is deleted, the garbage marking module 512 may identify the data packet as invalid. A read-modify-write operation is another way for a data packet to be identified as invalid. In one embodiment, the garbage marking module 512 may identify the data packet as invalid by updating an index. In another embodiment, the garbage marking module 512 may identify the data packet as invalid by storing another data packet that indicates that the invalid data packet has been deleted. This is advantageous because storing, in the solid-state storage media 110, information that the data packet has been deleted allows the object index reconstruction module 262 or similar module to reconstruct the object index with an entry indicating that the invalid data packet has been deleted.

In one embodiment, the storage capacity recovery apparatus 114 may be utilized to fill the remainder of a virtual page of data following a flush command in order to improve overall performance, where the flush command halts data flowing into the write pipeline 106 until the write pipeline 106 empties and all packets have been permanently written into non-volatile solid-state storage media 110. This has the benefit of reducing the amount of garbage collection required, the amount of time used to erase storage divisions, and the amount of time required to program virtual pages. For example, a flush command may be received when only one small packet is prepared for writing into the virtual page of the solid-state storage 100. Programming this nearly empty virtual page might result in a need to immediately recover the wasted space, causing the valid data within the storage division to be unnecessarily garbage collected and the storage division erased, recovered and returned to the pool of available space for writing by the sequential storage module 502.

Marking the data packet as invalid rather than actually erasing an invalid data packet is efficient because, as mentioned above, for flash memory and other similar storage an erase operation takes a significant amount of time. Allowing a garbage collection system, as described in the storage capacity recovery apparatus 114, to operate autonomously within the solid-state storage media 110 provides a way to separate erase operations from reads, writes, and other faster operations so that the solid-state storage device 102 can operate much faster than many other solid-state storage systems or data storage devices.

In one embodiment, the recovery management module 514 manages the recovery of storage space within the solid-state storage device 102. The recovery management module 514 monitors and governs the rate at which the storage capacity recovery apparatus 114 recovers storage capacity through garbage collection. The recovery management module 514, in one embodiment, uses closed-loop feedback control to determine and adjust a capacity reclaim rate for the solid-state storage device 102. In certain embodiments, the recovery management module 514 sets a storage capacity recovery rate at a substantially consistent level that has minimal effects on read and write performance of the solid-state storage device 102, while still maintaining sufficient storage capacity. By setting a consistent storage capacity recovery at a rate that satisfies user write operations, the recovery management module 514, in one embodiment, provides predictable input and output performance to a user, without the latency or performance disparities caused by large spikes in garbage collection related inputs and outputs. The recovery management module 514 is described in greater detail below with regard to FIGS. 7A and 7B.

Figure 6:
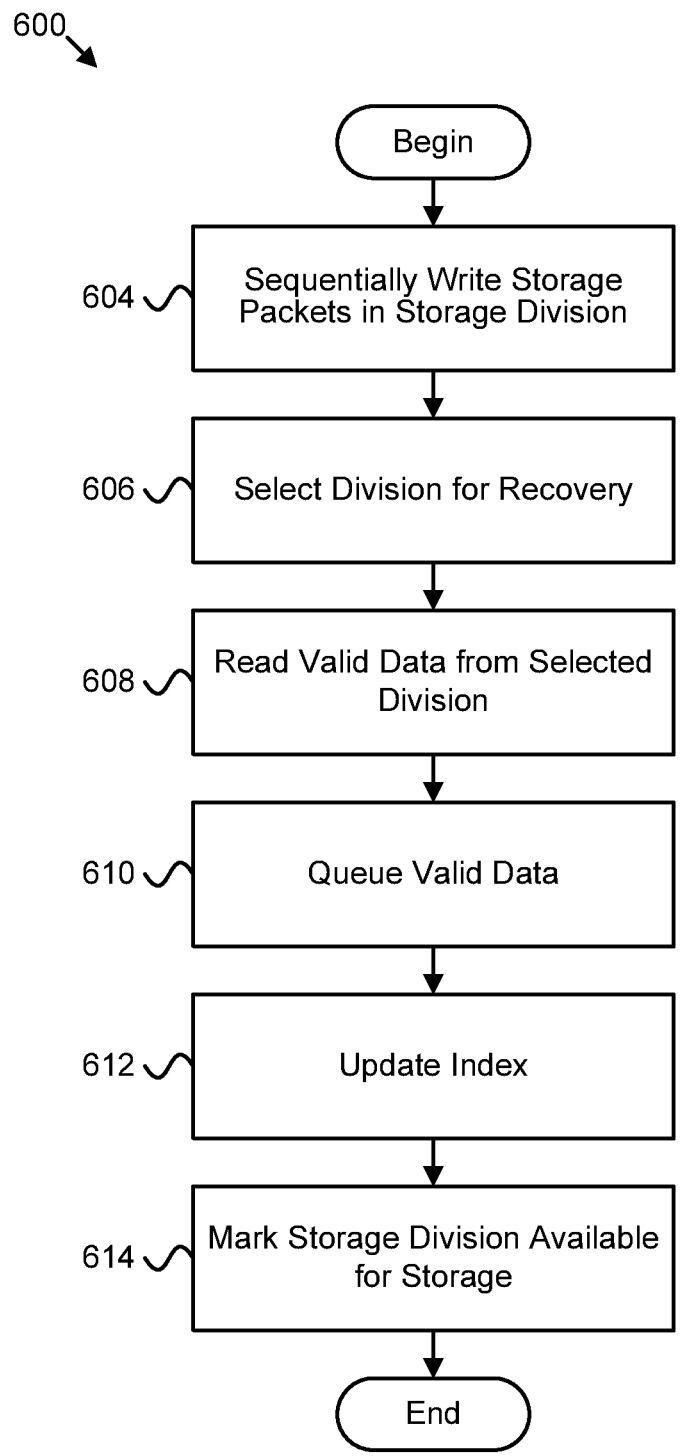
FIG. 6 is a schematic flow chart diagram illustrating one embodiment of a method for recovering storage capacity in accordance with the present invention.

FIG. 6 is a schematic flow chart diagram illustrating an embodiment of a method 600 for storage recovery in accordance with the present invention. The method 600 begins and the sequential storage module 502 sequentially writes 604 data packets in a storage division. The storage division is a portion of a solid-state storage media 110 in a solid-state storage device 102. Typically a storage division is an erase block. The data packets are derived from an object and the data packets are sequentially stored by order of processing.

The storage division selection module 504 selects 606 a storage division for recovery and the data recovery module 506 reads 608 valid data packets from the storage division selected for recovery. Typically valid data packets are data packets that have not been marked for erasure or deletion or some other invalid data marking and are considered valid or "good" data. The data recovery module 506 queues 610 the valid data packets with other data packets scheduled to be written sequentially by the sequential storage module 502. The data recovery module 506 updates 612 an index with a new physical address of the valid data written by the sequential storage module 502. The index includes a mapping of physical addresses of data packets to object identifiers. The data packets are those stored in stored in the solid-state storage media 110 and the object identifiers correspond to the data packets.

After the data recovery module 506 completes copying valid data from the storage division, the storage division recovery module 508 marks 614 the storage division selected for recovery as available to the sequential storage module 502 for sequentially writing data packets and the method 600 ends.

Figure 7A:
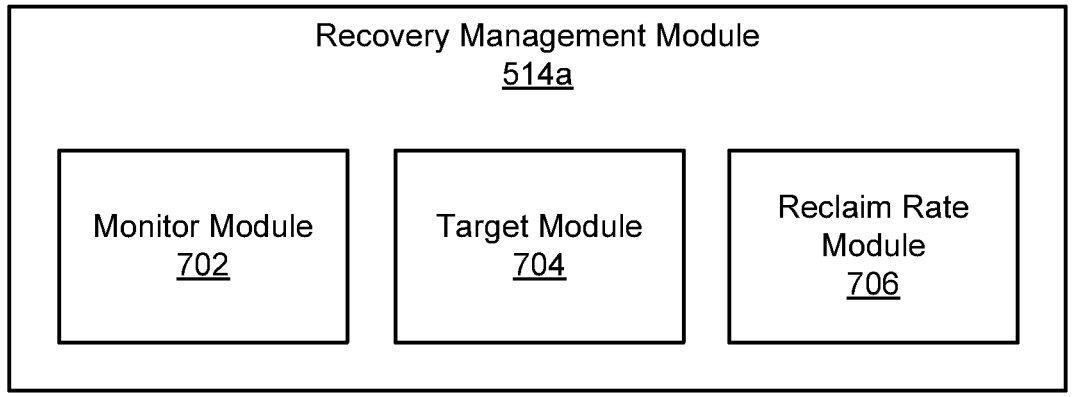
FIG. 7A is a schematic block diagram illustrating one embodiment of a recovery management module in accordance with the present invention.

FIG. 7A is a schematic block diagram illustrating one embodiment of a recovery management module 514a. In the depicted embodiment, the recovery management module 514a includes a monitor module 702, a target module 704, and a reclaim rate module 706. In certain embodiments, the recovery management module 514a may be substantially similar to the recovery management module 514 described above with regard to FIG. 5. As described above with regard to the storage capacity recovery apparatus 114 of FIG. 1, in various embodiments, the monitor module 702, the target module 704, and/or the reclaim rate module 706 may be a part of a device driver for the solid-state storage device 102 installed on the computer device 112, part of the solid-state storage controller 104, or both.

In one embodiment, the monitor module 702 monitors one or more reclamation parameters for the solid-state storage device 102, such as write bandwidths, read bandwidths, capacity reclaim rates, reclamation timeout values, total numbers of reclamation timeout periods, invalid data ratios for reclamation regions, remaining storage capacity, high and/or low available reserve capacity marks, reclamation buffer sizes, or the like. The monitor module 702, in one embodiment, monitors or otherwise determines one or more write bandwidths for the solid-state storage device 102, such as a total write bandwidth, a workload write bandwidth, and/or a reclamation write bandwidth. One or more of the reclamation parameters that the monitor module 702 monitors, such as a write bandwidth or the like, acts as a feedback input for the recovery management module 514 to govern the rate of storage capacity recovery on the solid-state storage device 102.

A write bandwidth is a rate at which write operations use, generate, and/or consume reclaimable storage capacity on the solid-state storage device 102. In one embodiment, the monitor module 702 monitors or otherwise determines a workload write bandwidth. A workload write bandwidth is a rate that workload (i.e. user) write operations use storage capacity of the solid-state storage device 102. A workload write bandwidth typically excludes system write operations, such as copy forward write operations from the storage capacity recovery apparatus 114, metadata write operations, and the like. In one embodiment, when a user storage capacity, such as an advertised storage capacity or the like, of the solid-state storage device 102 has been reached, a workload write bandwidth includes only user updates to existing data, as the usable user storage capacity of the solid-state storage device 102 is full.

In another embodiment, the monitor module 702 monitors or otherwise determines a reclamation write bandwidth. A reclamation write bandwidth is a rate that storage capacity recovery operations of the storage capacity recovery apparatus 114 use storage capacity of the solid-state storage device 102. In a further embodiment, the monitor module 702 may monitor or otherwise determine a total write bandwidth that includes both user write operations and system write operations, such as storage capacity recovery operations and the like.

The monitor module 702, in one embodiment, determines a write bandwidth (e.g. a total write bandwidth, a workload write bandwidth, a reclamation write bandwidth, etc.) by counting, tallying, or otherwise determining how much data is written to the solid-state storage device 102 over one or more predefined time periods. In another embodiment, the monitor module 702 subtracts a total amount of data written to the solid-state storage device 102 up to a previous time from a total amount of data written to the solid-state storage device 102 up to a current time to determine an amount of data written in a current time period (the time between the current time and the previous time). To determine the write bandwidth for the current time period, the amount of data written in the current time period is divided by the length of the current time period.

In certain embodiments, the solid-state storage controller 104 may track the total amount of physical bytes written to the solid-state storage device 102. In such embodiments, the solid-state storage controller 104 may make the total amount of physical bytes written available to the monitor module 702. In certain embodiments, the solid-state storage controller 104 may track or monitor the total amount of logical data bytes written to the solid-state storage device 102. The solid-state storage controller 104 may make the total amount of logical data bytes written available to the monitor module 702. Logical data bytes written typically includes user/workload data and excludes metadata and data written as a result of grooming or storage space recovery, so that the monitor module 702 may use the logical data bytes written to determine a workload write bandwidth.

In one embodiment, the monitor module 702, a software driver for the solid-state storage device 102, a solid-state storage controller 104, or the like persistently stores a tally of the total physical amount and/or logical amount of data written to the solid-state storage device 102. The tally may be persistently stored at intervals on the solid-state storage device 102. For example, in one embodiment, the monitor module 702, a software device driver for the solid-state storage device 102, a solid-state storage controller 104, or the like may store a tally of the total amount of data written to the solid-state storage device 102 with metadata stored on the solid-state storage media 110 associated with each erase block, such as a PEB, a logical erase block ("LEB"), or the like, or with each of another type of storage division or region of the storage device 102. Preferably, this metadata is written before user data for a PEB or LEB is written. In this manner, in embodiments that write new PEBs or LEBs as part of a log-based set of sequential writes, a running total for the physical bytes written to the solid-state storage media 110 is persistently preserved before any additional data is written to the solid-state storage device 102.

One location in which the monitor module 702, a software driver for the solid-state storage device 102, a solid-state storage controller 104, or the like may store a total written data tally is with other metadata in an erase block opener at the beginning of each erase block as data is written sequentially to the solid-state storage device 102. An erase block opener, in certain embodiments, is a set of data written to an erase block with metadata for the erase block, metadata for the solid-state storage device 102, or the like. In one embodiment, an erase block opener is written to each erase block in succession with updated statistics, counts, tallies, or other metadata for the solid-state storage device 102 such that the most recently written erase block opener includes the most recent metadata. The monitor module 702, in one embodiment, reads or determines a current total written data tally up through the end of a current sampling period and subtracts a total written data tally up through the previous sampling period to determine the amount of data written during the current sample period, to determine a write bandwidth.

The monitor module 702, in certain embodiments, uses a reclamation write bandwidth as an indicator or estimator of a past capacity reclaim rate for the solid-state storage device 102. For example, the monitor module 702 may use a reclamation write bandwidth and an invalid data ratio for one or more reclamation regions to determine and/or estimate a past capacity reclaim rate for the stolid-state storage device 102, to convert between a write bandwidth and a capacity reclaim rate, or the like.

An invalid data ratio (or emptiness ratio) is a ratio of the invalid data in one or more reclamation regions of the solid-state storage device 102, such as one or more logical or physical erase blocks. The invalid data ratio is the percentage of space that would be freed if the one or more reclamation regions were reclaimed. The monitor module 702 (or another module such as the target module 704 or the reclaim rate module 706 that uses reclamation parameters from the monitor module 702) may use a reclamation write bandwidth and an invalid data ratio to determine a past capacity reclaim rate, as a representation of a past capacity reclaim rate, and/or to convert between a write bandwidth and a capacity reclaim rate, instead of monitoring a capacity reclaim rate directly. Monitoring a reclamation write bandwidth, in certain embodiments, may be simpler and/or more efficient than monitoring capacity reclaim rate directly. In other embodiments, the monitor module 702 may monitor a capacity reclaim rate directly.

In one embodiment, the monitor module 702 monitors a read bandwidth for the solid-state storage device 102 as well as one or more write bandwidths. Because write bandwidths and read bandwidths both use resources of the solid-state storage device 102, monitoring a read bandwidth may provide an additional metric by which the recovery management module 514 may determine how many resources to allocate to storage capacity reclamation operations. In further embodiments, the monitor module 702 may monitor, track, or otherwise determine a capacity recovery timeout value, a total number of capacity recovery timeout periods, an invalid data ratio for one or more reclamation regions, a remaining storage capacity, a high and/or low storage capacity watermark, and/or other reclamation parameters.

Write bandwidths and other reclamation parameters typically change over time, and the monitor module 702, in certain embodiments, periodically monitors and redetermines one or more reclamation parameters for the solid-state storage device 102, such as a write bandwidth or the like. The monitor module 702, for example, may determine one or more reclamation parameters for the solid-state storage device 102 for each of a plurality of monitoring periods. The monitor module 702, in certain embodiments, provides a determined write bandwidth and/or one or more other reclamation parameters to the target module 704 as a feedback input for determining a capacity reclaim rate. The feedback input may include a proportional feedback control input, an integral feedback control input, a derivative feedback control input, or another type of feedback control input. Operating in a feedback loop configuration, in certain embodiments, allows the recovery management module 514 to smooth a capacity reclaim rate of the solid-state storage device 102, preventing spikes in storage recovery related inputs and outputs and leveling performance disparities.

In one embodiment, the target module 704 determines a target capacity reclaim rate for the solid-state storage device 102. A capacity reclaim rate is a rate at which the storage capacity recovery apparatus 114 reclaims storage capacity of the solid-state storage device 102, freeing the reclaimed storage capacity to store subsequent data. A capacity reclaim rate may be measured in an amount of data per time period, such as bytes per second or the like. In certain embodiments, the target module 704 sets the target capacity reclaim rate based on one or more reclamation parameters that the monitor module 702 monitors, tracks, or otherwise determines. For example, the target module 704 may determine a target capacity reclaim rate that satisfies a workload write bandwidth that the monitor module 702 determines for the solid-state storage device 102.

In one embodiment, the target module 704 determines or sets the target capacity reclaim rate to a level that satisfies a workload write bandwidth for the solid-state storage device 102. A target capacity reclaim rate, in various embodiments, may satisfy a workload write bandwidth by being within a predefined range of the workload write bandwidth, by being greater than or equal to the workload write bandwidth, by approaching the workload write bandwidth, by matching the workload write bandwidth, and/or having another predefined relationship to the workload write bandwidth.

In one embodiment, if the amount of remaining storage capacity of the solid-state storage device 102 satisfies a storage capacity threshold, such as when the used capacity is less than a maximum user capacity or the like, then any target capacity reclaim rate, even a target capacity reclaim rate below the workload write bandwidth, satisfies the workload write bandwidth. In a further embodiment, if the remaining storage capacity of the solid-state storage device 102 fails to satisfy a capacity threshold (e.g. crosses the capacity threshold, falls below the capacity threshold, or the like), then the target capacity reclaim rate satisfies the workload write bandwidth by meeting or exceeding the write bandwidth. By setting a target capacity reclaim rate equal to or greater than a workload write bandwidth, at least when a remaining storage capacity fails to satisfy a capacity threshold, the solid-state storage device 102 may perform workload write operations indefinitely without running out of available storage capacity.

In one embodiment, storage capacity reclamation does take place or takes place at a minimal level until an amount of used storage capacity reaches or exceeds a maximum user capacity or other capacity threshold, using reserved storage capacity or the like. A user capacity is an amount of storage capacity that is presented to a user, to the computer device 112, or the like as the total available storage capacity of the solid-state storage device 102. The solid-state storage device 102, in addition to the user capacity, may have additional reserved capacity for system use, for overflow, for replacement storage capacity in the case of bad blocks, or the like. Once workload writes have filled the user capacity of the solid-state storage device 102, subsequent workload writes are typically updates, which invalidate and replace existing data, generating freeable or reclaimable space. If a user is simply writing to new or unused logical block addresses, then storage capacity recovery typically cannot occur for the new or unused addresses, because storage capacity is not typically freed until data is invalidated by a subsequent write, or the like.

The target module 704, in certain embodiments, determines the target capacity reclaim rate based on one or more reclamation parameters from the monitor module 702, such as a workload write bandwidth, a reclamation write bandwidth, a past reclaim rate, an invalid data ratio for one or more reclamation regions, a current amount of remaining storage capacity, a high available reserve capacity mark, a low available reserve capacity mark, a reclamation timeout value, a current number of reclamation timeout periods, a reclamation buffer size, and/or one or more other reclamation parameters. The target module 704 uses one or more monitored reclamation parameters from the target module 704 as feedback inputs to determine the target capacity reclaim rate. In one embodiment, the target module 704 redetermines the target capacity reclaim rate periodically as the monitor module 702 updates one or more monitored reclamation parameters. The target module 704 may redetermine the target capacity reclaim rate each monitoring period, in response to a change in a reclamation parameter, or the like.

In one embodiment, in addition to a workload write bandwidth, the target module 704 uses one or more additional reclamation parameters that the monitor module 702 determines to determine the target capacity reclaim rate, such as an invalid data ratio, a read write bandwidth, or the like. The target module 704 may use an invalid data ratio for one or more reclamation regions of the solid-state storage device 102 with a workload write bandwidth to determine the target capacity reclaim rate as a target reclamation write rate or target reclamation write bandwidth, an indirect indicator of the target capacity reclaim rate. In one embodiment, the target module 704 determines a target reclamation write rate/target reclamation write bandwidth such that a capacity reclaim rate associated with the target reclamation write rate/target reclamation write bandwidth satisfies a workload write bandwidth, as described above. The target module 704, in certain embodiments, may multiply a workload write bandwidth by one minus an invalid data ratio divided by the invalid data ratio to determine a target reclamation write rate or bandwidth for a target capacity reclaim rate as given by Equation 1 below.

$$\text{Target Reclamation Write Rate} = \text{Workload Write Rate} \times \left( \frac{1 - \text{Invalid Data Ratio}}{\text{Invalid Data Ratio}} \right) \quad (1)$$

As described above, an invalid data ratio (or emptiness ratio) is a ratio of the invalid data in one or more reclamation regions of the solid-state storage device 102, and represents the percentage of space freed when the one or more reclamation regions are reclaimed. For example, if a particular logical erase block had 60% invalid data and 40% valid data, to free up that block the storage division recovery module 508 would copy forward the valid 40% of the data in the logical erase block, and recover the logical erase block, adding a net 60% of a logical erase block to a free space pool for the solid-state storage device 102. In certain embodiments, the target module 704 bases the target capacity reclaim rate (and/or a target reclamation write rate) at least partially on an invalid data ratio to account for a portion of a reclamation region that will be added to a free space pool in response to recovering the storage capacity of the reclamation region, to convert a write rate to a reclaim rate, or the like.

In one embodiment, the target module 704 scales the target capacity reclaim rate by a scaling factor. A scaling factor may include an invalid data ratio as described above. In another embodiment, the target module 704 may scale the target capacity reclaim rate up or down based on a remaining storage capacity of the solid-state storage device 102, or the like, to increase the target capacity reclaim rate proportionally as the remaining storage capacity decreases. One embodiment of a target capacity reclaim rate scaled by a remaining storage capacity and an additional scaling factor K is given by Equation 2.

$$\text{Target Reclamation Write Rate} = \text{Equation } 1 \times K \times \left( \frac{\text{High Mark} - \text{Free Space}}{\text{High Mark} - \text{Low Mark}} \right) \quad (2)$$

In Equation 2, the remaining storage capacity factor is represented by the high available reserve capacity mark minus the remaining storage capacity (free space), divided by the high available reserve capacity mark minus the low available reserve capacity mark. The remaining storage capacity factor of Equation 2 scales the target capacity reclaim rate down when the remaining storage capacity is toward the high available reserve capacity mark and scales the target capacity reclaim rate up when the remaining storage capacity is toward the low available reserve capacity mark as the remaining storage capacity decreases.

In certain embodiments, the target module 704 adjusts or scales the target capacity reclaim rate based on or to account for one or more additional reclamation parameters. For example, because the write bandwidth and read bandwidth both use system resources, the target module 704, in certain embodiments, may determine the target capacity reclaim rate at least partially based on a determined read bandwidth for the solid-state storage device 102, to minimize the effects of storage capacity reclamation on the read bandwidth, or the like.

In one embodiment, the reclaim rate module 706 determines a prospective capacity reclaim rate for the solid-state storage device 102 that corresponds to a target capacity reclaim rate that the target module 704 determines. A prospective capacity reclaim rate corresponds to a target capacity reclaim rate when the prospective capacity reclaim rate is in a direction of or toward the target capacity reclaim rate, is within a predefined range of the target capacity reclaim rate, is closer to the target capacity reclaim rate than a past capacity reclaim rate, equals the target capacity reclaim rate, or the like. The reclaim rate module 706 may base a prospective capacity reclaim rate on a write bandwidth that the monitor module 702 determines, such as a past reclamation write bandwidth. In certain embodiments, the reclaim rate module 706 determines a prospective capacity reclaim rate as an adjustment to a past capacity reclaim rate, adjusting the past capacity reclaim rate toward and/or in a direction of the target capacity reclaim rate to determine the prospective capacity reclaim rate.

In certain embodiments, the reclaim rate module 706 may set a capacity reclaim rate for the solid-state storage device 102 directly and substantially exactly, and the reclaim rate module 706 sets the prospective capacity reclaim rate to match the target capacity reclaim rate substantially exactly. In other embodiments, it may not be possible to set a capacity reclaim rate for the solid-state storage device 102 directly or it may be more efficient to set a capacity reclaim rate for the solid-state storage device 102 indirectly, and the reclaim rate module 706 may determine the prospective reclaim rate as an indirect adjustment to another parameter that influences a capacity reclaim rate for the solid-state storage device 102.

The reclaim rate module 706 may determine a prospective reclaim rate, in various embodiments, as an adjustment to a frequency at which capacity reclamation operations reclaim storage capacity, as an adjustment to the number of reclamation regions that a capacity reclamation operation reclaims during a reclamation period, as an adjustment to a size of a buffer associated with a capacity reclamation operation, and/ or as an adjustment to another reclamation parameter that affects a reclaim rate of the storage capacity recovery apparatus 114. By determining a prospective capacity reclaim rate as an adjustment to one or more reclamation parameters, the reclaim rate module 706 may indirectly control or influence a capacity reclaim rate of the solid-state storage device 102 to correspond to the target capacity reclaim rate.

The reclaim rate module 706, in one embodiment, sets and/or adjusts a prospective capacity reclaim rate by setting a timeout value associated with a frequency of capacity reclamation operations. In certain embodiments, the timeout value accelerates or slows down a capacity reclaim rate for the solid-state storage device 102 by setting an amount of time that the storage capacity recovery apparatus 114 sleeps in between units of work, such as a reclamation period. The reclaim rate module 706, in further embodiments, may determine a runtime for reclamation, comprising an amount of time and/or recovery that the storage capacity recovery apparatus 114 runs each during reclamation period, between timeout values.

For example, the reclaim rate module 706 may determine a previous runtime for reclamation operations using Equation 3 below, determine a prospective runtime for reclamation operations using Equation 4 below, and/or determine a prospective timeout for reclamation operations using Equation 5 below to indirectly determine and set a prospective capacity reclaim rate for the solid-state storage device 102, where T is a current time.

$$\text{Previous Runtime} = T - \text{Previous Timeout} \times \text{Past Timeouts} \quad (3)$$

$$\text{Prospective Runtime} = \frac{\text{Target } Recl. \text{ Write Rate} \times \text{Previous Runtime}}{\text{Past Reclamation Write Rate}} \quad (4)$$

$$\text{Prospective Timeout} = \frac{T - \text{Prospective Runtime}}{\text{Past Timeouts}} \quad (5)$$

Once the reclaim rate module 706 sets the prospective capacity reclaim rate, in certain embodiments, the monitor module 702 monitors an actual or past capacity reclaim rate, so that the target module 704 and/or the reclaim rate module 706 may determine if the past capacity reclaim rate satisfies the workload write bandwidth. As described above, the monitor module 702 may monitor an actual/past capacity reclaim rate indirectly as a past reclamation write bandwidth, or the like. The reclaim rate module 706, in one embodiment, redetermines and/or adjusts the prospective capacity reclaim rate in response to the past capacity reclaim rate failing to satisfy the workload write bandwidth. In certain embodiments, the reclaim rate module 706 may base a magnitude of an adjustment on a difference between the past capacity reclaim rate and the target capacity reclaim rate, or the like.

The reclaim rate module 706 may redetermine and/or adjust the prospective capacity reclaim rate based on the past capacity reclaim rate to correspond to the target capacity reclaim rate and to satisfy the workload write bandwidth, as redetermined or updated. For example, if the past capacity reclaim rate for an adjustment period is lower than the target capacity reclaim rate and/or does not satisfy the workload write bandwidth, the reclaim rate module 706 may increase the prospective capacity reclaim rate toward the target capacity reclaim rate. Conversely, if the past capacity reclaim rate for an adjustment period is higher than the target capacity reclaim rate, in certain embodiments, the reclaim rate module 706 may decrease the prospective capacity reclaim rate. The monitor module 702 may also redetermine a workload write bandwidth for the solid-state storage device 102, the target module 704 may redetermine the target capacity reclaim rate to satisfy the redetermined workload write bandwidth, and the reclaim rate module 706 may redetermine and/or adjust the capacity reclaim rate to correspond to the redetermined target capacity reclaim rate.

The reclaim rate module 706, in one embodiment, performs an adjustment of a prospective capacity reclaim rate, provides a prospective capacity reclaim rate and/or an adjustment of a prospective capacity reclaim rate to the storage capacity recovery apparatus 114 or the like, to implement a prospective capacity reclaim rate. The reclaim rate module 706 may initiate one or more capacity reclamation operations according to a determined prospective capacity reclaim rate. In certain embodiments, the storage capacity recovery apparatus 114 performs storage capacity recovery at a determined prospective capacity reclaim rate or with an adjustment of a prospective capacity reclaim rate, to stabilize user read and write performance of the solid-state storage device 102, to prevent significant spikes or dips in performance associated with traditional on/off step function storage capacity recovery, or the like.

Figure 7B:
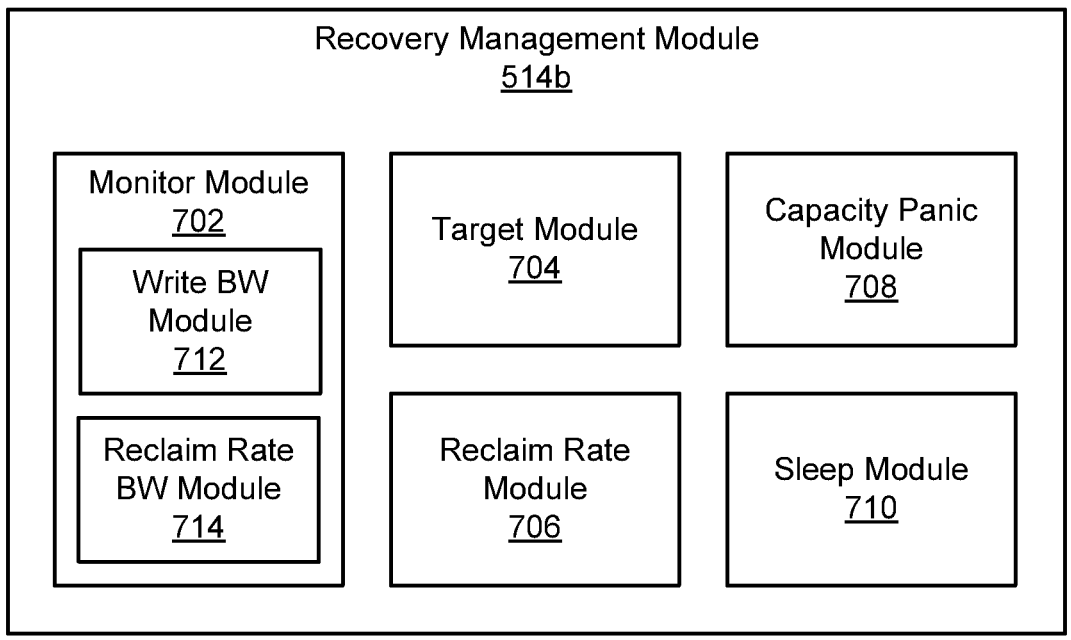
FIG. 7B is a schematic block diagram illustrating another embodiment of a recovery management module in accordance with the present invention.

FIG. 7B depicts one embodiment of a recovery management module 514b. In the depicted embodiment, the recovery management module 514b includes the monitor module 702, the target module 704, and the reclaim rate module 706 and further includes a capacity panic module 708 and a sleep module 710. The monitor module 702, in the depicted embodiment, includes a workload bandwidth module 712 and a reclamation bandwidth module 714. In certain embodiments, the recovery management module 514b may be substantially similar to the recovery management module 514a described above with regard to FIG. 7A and/or the recovery management module 514 described above with regard to FIG. 5.

In one embodiment, the capacity panic module 708 prevents the solid-state storage device 102 from running out of storage capacity. If the remaining storage capacity of the solid-state storage device 102 passes below a certain panic threshold and/or if the target capacity reclaim rate exceeds a certain reclaim rate threshold that the storage capacity recovery apparatus 114 cannot meet, then he capacity panic module 708 temporarily halts workload write operations for the solid-state storage device 102. The capacity panic module 708 halts workload write operations in order to allow the storage capacity recovery apparatus 114 exclusive access to the solid-state storage device 102 to reclaim storage capacity at an increased rate, increasing the remaining storage capacity and/or decreasing the target capacity reclaim rate.

Halting workload writes, in certain embodiments, may result in temporarily decreasing write performance of the solid-state storage device 102, but may ensure that the storage capacity recovery apparatus 114 does not run out of storage capacity. The capacity panic module 708 acts as a safety measure, preventing the solid-state storage device 102 from becoming so full that there is no longer available storage capacity to perform system functions and service write operations.

In one embodiment, the sleep module 710 suspends and/or slows capacity reclamation operations when reclamation is not needed to satisfy a workload write bandwidth. If a remaining storage capacity of the solid-state storage device 102 exceeds a high capacity threshold, such as a high available reserve capacity mark, the sleep module 710 suspends capacity reclamation operations and/or slows capacity reclamation operations to a minimum level. Temporarily suspending capacity reclamation operations allows the solid-state storage device 102 to read and write at a faster rate than during capacity reclamation operations, increasing performance of the solid-state storage device 102. Because, in certain embodiments, the sleep module 710 suspends capacity reclamation operations when the remaining storage capacity exceeds a high capacity threshold, the temporary suspension of capacity reclamation operations does not result in any risk of running out of remaining storage capacity.

As described above with regard to FIG. 7A, in certain embodiments, the monitor module 702 monitors or otherwise determines both a workload write bandwidth and an actual/past reclamation rate for the solid-state storage device 102. In the depicted embodiment, the monitor module 702 uses the workload bandwidth module 712 to monitor a workload write bandwidth for the solid-state storage device 102 and uses the reclaim rate bandwidth module 714 to monitor an actual/past reclamation rate for the solid-state storage device 102, the rate at which reclaimable storage capacity on the solid-state storage device 102 is reclaimed and made available for use. In certain embodiments, the reclaim rate bandwidth module 714 monitors an actual/past reclamation rate for the solid-state storage device 102 indirectly as a past reclamation write rate and an invalid data ratio. One of skill in the art, in light of this disclosure, will recognize other reclamation parameters, such as a reclamation write bandwidth, a past capacity reclaim rate, an invalid data ratio for one or more reclamation regions, a current amount of remaining storage capacity, a high available reserve capacity mark, a low available reserve capacity mark, a reclamation timeout value, a current number of reclamation timeout periods, a reclamation buffer size, and/or one or more other reclamation parameters In one embodiment, the solid-state storage device 102 includes a sequential log-based writing structure with one or more append points. In certain embodiments, the log-based writing structure includes a single append point. Workload data and capacity reclamation data are written to the single append point in order, in one embodiment, so that workload data and capacity reclamation data are not written simultaneously. The write order may, in various embodiments, include workload data first, capacity reclamation data first, or an intermix of workload data and capacity reclamation data, so long as the workload data and capacity reclamation data are not written to the append point simultaneously. This means that when user writes are occurring, storage capacity recovery writes are not occurring, and when storage capacity recovery writes are occurring, user writes are not occurring.

Figure 8A:
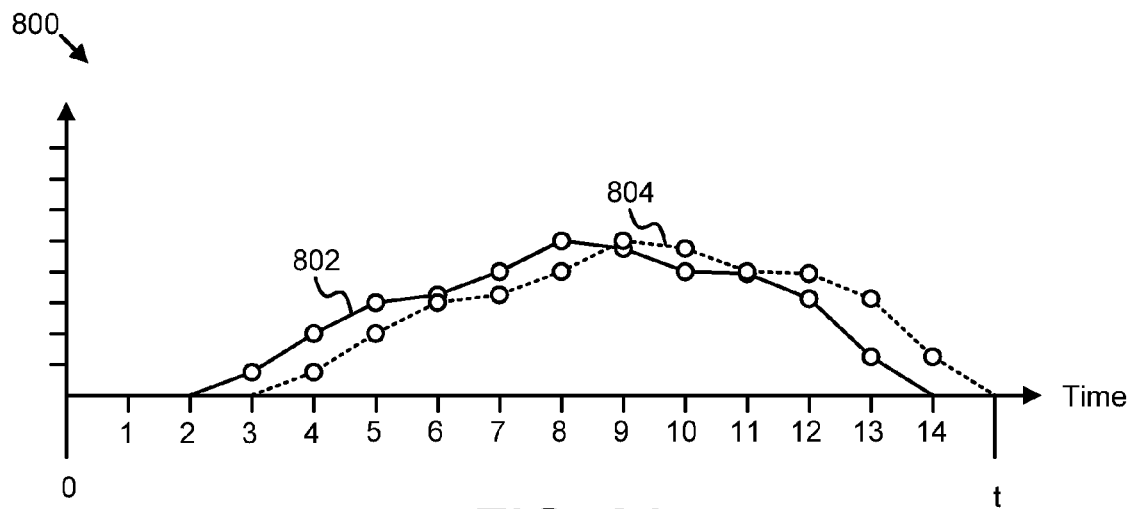
FIG. 8A is a schematic block diagram illustrating one embodiment of a write bandwidth and a storage capacity reclamation rate in accordance with the present invention.

FIG. 8A depicts a graph 800 illustrating one embodiment of a workload write bandwidth 802 and a capacity reclaim rate 804 over time. During the depicted time, the capacity reclaim rate 804 tracks or follows the workload write bandwidth 802 as the monitor module 702 determines the workload write bandwidth 802 each monitoring period 0 through t, the target module 704 determines a target capacity reclaim rate, and the reclaim rate module 706 determines and/or adjusts the capacity reclaim rate 804 toward the target capacity reclaim rate each monitoring period 0 through t. In the depicted illustration, the capacity reclaim rate 804 tracks or follows the workload write bandwidth 802, instead of matching the workload write bandwidth 802 exactly, because the recovery management module 514 uses a feedback model to adjust the capacity reclaim rate 804 over time, causing the capacity reclaim rate 804 to lag the workload write bandwidth 802 by one monitoring period. In certain embodiments, the capacity reclaim rate 804 may eventually settle at the workload write bandwidth 802.

Each unit of time 0 through t, in the depicted illustration, is a monitoring period. The monitor module 710 determines the write bandwidth 802, such as a workload write bandwidth, and/or other reclamation parameters at each monitoring period. In certain embodiments, a reclamation timeout period is less than or equal to the monitoring period, so that at least one storage capacity recovery operation occurs during each monitoring period.

Figure 8B:
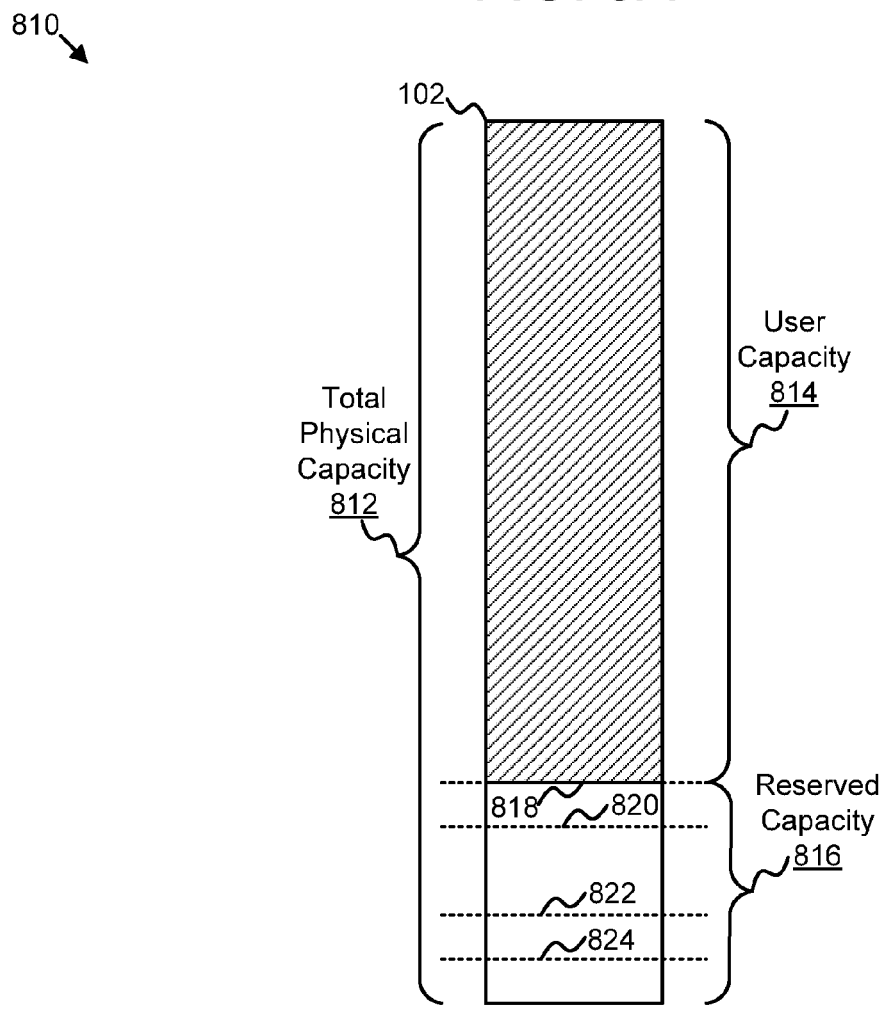
FIG. 8B is a schematic block diagram illustrating one embodiment of a solid-state storage device in accordance with the present invention.

FIG. 8B depicts one embodiment 810 of the solid-state storage device 102. In the depicted embodiment 810, the solid-state storage device 102 includes a total physical capacity 812, a user capacity 814, a reserved capacity 816, a maximum user capacity threshold 818, a high available reserve capacity mark 820, a low available reserve capacity mark 822, and a panic threshold 824.

In certain embodiments, when the used storage capacity does not exceed a maximum user capacity threshold 818, little or no storage capacity reclamation operations occur. The maximum user capacity threshold 818 may be set equal to the high available reserve capacity mark 820, and may differ from the exact user capacity 814 as storage capacity of the reserved capacity 816 is used to supplement bad blocks of the user capacity 814, or the like.

The high available reserve capacity mark 820 is the maximum amount of reserve capacity 816 that may be available when the entire use capacity 814 is full with workload/user data, given one or more other uses of the reserved capacity 816, such as to replace or supplement bad blocks or the like. The low available reserve capacity mark 820 is the minimum amount of reserve capacity that may be available during typical operation of the solid-state storage device 102. The low available reserve capacity mark 820 may be selected to account for system storage overhead for metadata, system storage overhead for storage capacity recovery (such as copying valid data forward), or the like. In certain embodiments, the low available reserve capacity mark 822 may be set equal to the panic threshold 824. In other embodiments, the high available reserve capacity mark 820 and/or the low available reserve capacity mark 822 may be set based on a history of available reserve capacity 816 for the solid-state storage device 102.

In one embodiment, when a used capacity and/or a remaining available capacity of the solid-state storage device 102 is in the region between the high available reserve capacity mark 820 and the low available reserve capacity mark 822, the storage capacity recovery apparatus 114 performs storage capacity recovery, with the recovery management module 514 setting a target capacity reclaim rate at or above a workload write bandwidth for the solid-state storage device 102 to satisfy the workload write bandwidth. In certain embodiments, the storage capacity recovery apparatus 114 may perform a minimal amount of storage capacity recovery (i.e. little or no storage capacity recovery) when a used capacity and/or a remaining available capacity of the solid-state storage device 102 is in the region between empty and the high available reserve capacity mark 820.

The storage capacity recovery apparatus 114 may perform at least a minimal amount of storage capacity recovery even if the used storage capacity is not in the region between the high available reserve capacity mark 820 and the low available reserve capacity mark 822 to help stabilize user read and write performance, to prevent read disturb, to provide wear leveling, or the like. In an additional embodiment, as described above, the target module 704 may scale the target capacity reclaim rate up or down depending on the amount of remaining storage capacity between the high available reserve capacity mark 820 and the low available reserve capacity mark 822, so that the target capacity reclaim rate increases relative to the workload write bandwidth as the amount of remaining storage capacity approaches the low available reserve capacity mark 822.

When a remaining storage capacity satisfies the panic threshold 824, the capacity panic module 708 halts workload write operations to prevent the use of further reserve capacity 816 while the storage capacity recover apparatus 114 recovers storage capacity to move the amount of remaining storage capacity away from the panic threshold 824. When the workload write operations are halted, storage capacity recovery operations may continue at an increased rate, to recover available storage capacity quickly so that workload write operations may resume. In one embodiment, the panic threshold 824 is set so that there is a minimum storage capacity remaining to maintain operation of the solid-state storage device 102 when the panic threshold 824 is met. One of skill in the art, in light of this disclosure, will recognize other arrangements of the total physical capacity 812, the user capacity 814, the reserved capacity 816, the high available reserve capacity mark 820, the maximum user capacity threshold 818, the low available reserve capacity mark 822, and/or the panic threshold 824 suitable for use with the solid-state storage device 102 and the recovery management module 514.

Figure 8C:
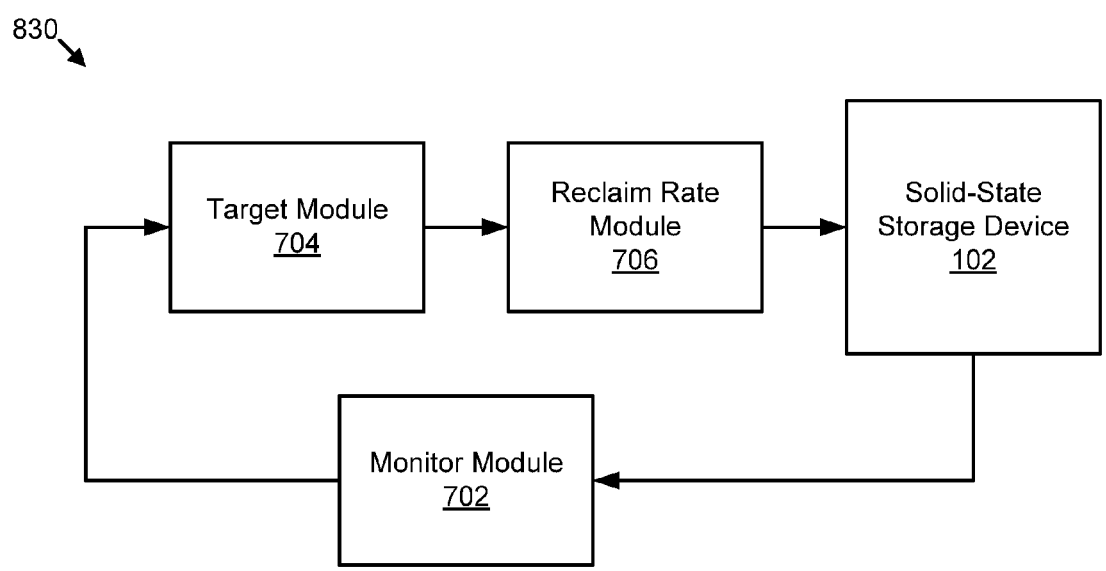
FIG. 8C is a schematic block diagram illustrating one embodiment of a feedback loop in accordance with the present invention.

FIG. 8C depicts one embodiment of a feedback loop 830 configuration for the storage capacity recovery apparatus 114. The feedback loop 830 provides closed-loop feedback control for the storage capacity recovery apparatus 114. In the depicted embodiment, the monitor module 702 comprises the feedback portion of the feedback loop 830, monitoring the solid-state storage device 102 to determine one or more reclamation parameters and providing the one or more reclamation parameters to the target module 704 as feedback inputs. As described above, reclamation parameters may include one or more of a workload write bandwidth, a reclamation write bandwidth, a past reclaim rate, an invalid data ratio for one or more reclamation regions, a current amount of remaining storage capacity, a high available reserve capacity mark, a low available reserve capacity mark, a reclamation timeout value, a current number of reclamation timeout periods, a reclamation buffer size, or the like. The one or more reclamation parameters that the monitor module 702 provides to the target module 704 as a feedback input, in one embodiment, includes at least a write bandwidth, such as a workload write bandwidth, a reclamation write bandwidth, a total write bandwidth, or the like.

The target module 704, in the depicted embodiment, determines a target capacity reclaim rate using one or more feedback inputs from the monitor module 702. The target module 704 may use various feedback control methods to determine the target capacity reclaim rate, such as proportional feedback control, integral feedback control, derivative feedback control, or another feedback control method.

In one embodiment, the target module 704 uses a proportional feedback control method to determine a target capacity reclaim rate based on present values for the one or more reclamation parameters from the monitor module 702. In a further embodiment, the target module 704 uses an integral feedback control method to determine a target capacity reclaim rate based on a plurality of historic values for the one or more reclamation parameters from the monitor module 702. In another embodiment, the target module 704 uses a derivative feedback control method to determine a target capacity reclaim rate based on a rate of change in the one or more reclamation parameters from the monitor module 702. One of skill in the art, in light of this disclosure, will recognize other types of feedback control that the target module 704 may use to determine a target capacity reclaim rate based on one or more reclamation parameters from the monitor module 702.

The reclaim rate module 706 determines a prospective capacity reclaim rate to correspond to the target capacity reclaim rate. As an output of the feedback loop 830, the storage capacity recovery apparatus 114 recovers storage capacity of the solid-state storage device 102 at the prospective capacity reclaim rate. The monitor module 702 periodically redetermines the one or more reclamation parameters for the solid-state storage device 102 to continue to provide feedback input to the target module 704 and/or the reclaim rate module 706, to audit the efficacy of the target capacity reclaim rate and/or the prospective capacity reclaim rate so that the target module 704 and/or the reclaim rate module 706 may make further adjustments.

In certain embodiments, the monitor module 702 and the target module 704 act as a data gathering phase of the feedback loop 830, determining one or more reclamation parameters and a target capacity reclaim rate. The reclaim rate module 706, in certain embodiments, acts as an enforcement phase of the feedback loop 830, providing a prospective capacity reclaim rate or corresponding adjustment to the storage capacity recovery apparatus 114 to enforce the determinations of the data gathering phase.

Figure 9:
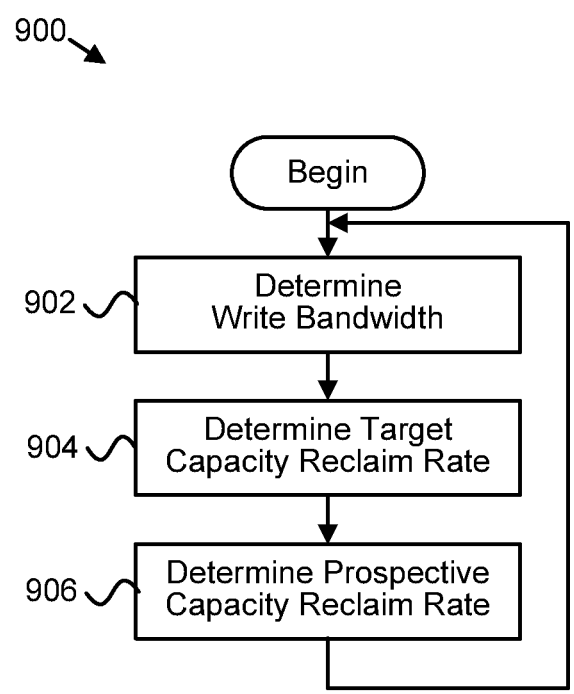
FIG. 9 is a schematic flow chart diagram illustrating one embodiment of a method for managing storage capacity recovery in accordance with the present invention.

FIG. 9 depicts one embodiment of a method 900 for storage capacity recovery. The method 900 begins and the monitor module 702 determines 902 a write bandwidth for the solid-state storage device 102, such as a workload write bandwidth and/or a reclamation write bandwidth. The target module 704 determines 904 a target capacity reclaim rate to satisfy the determined 902 write bandwidth. The reclaim rate module 706 determines 906 a prospective capacity reclaim rate to correspond to the determined 904 target capacity reclaim rate. The method 900 repeats as the monitor module 702 continues to determine 902 a write bandwidth in a feedback loop and the method 900 continues.

Figure 10:
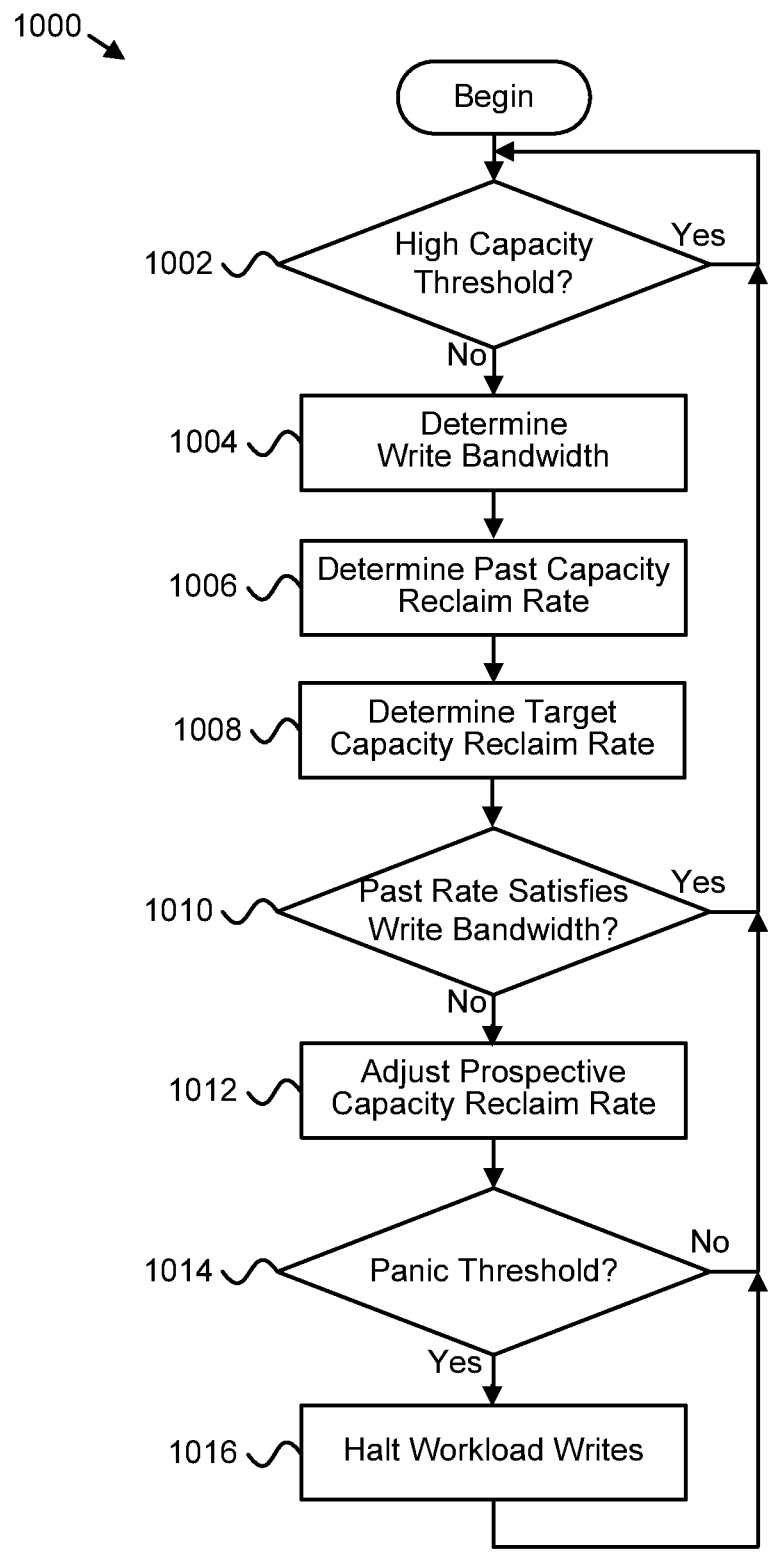
FIG. 10 is a schematic flow chart diagram illustrating another embodiment of a method for managing storage capacity recovery in accordance with the present invention.

FIG. 10 depicts another embodiment of a method 1000 for storage capacity recovery. The method 1000 begins and the sleep module 710 determines 1002 whether an available storage capacity of the solid-state storage device 102 satisfies a high capacity threshold, such as a maximum user capacity threshold 818, a high available reserve capacity mark 820, or the like. If the available storage capacity satisfies the high capacity threshold, the sleep module 710 continues to monitor 1002 the available storage capacity, suspending storage space recovery operations or maintaining them at a minimal level.

If the available storage capacity does not satisfy the high capacity threshold, the monitor module 702 determines 1004 a workload write bandwidth for the solid-state storage device 102. The monitor module 702 determines 1006 a past capacity reclaim rate for the solid-state storage device 102. The target module 704 determines 1008 a target capacity reclaim rate to satisfy the determined 1004 workload write bandwidth.

The reclaim rate module 706 determines 1010 if the past capacity reclaim rate satisfies the workload write bandwidth and/or the target capacity reclaim rate. If the past capacity reclaim rate satisfies the workload write bandwidth and/or the target capacity reclaim rate, the reclaim rate module 706 does not adjust 1012 a prospective capacity reclaim rate for the solid-state storage device 102, and the method 1000 restarts, with the sleep module 710 continuing to monitor 1002 the available storage capacity.

If the past capacity reclaim rate does not satisfy the workload write bandwidth, the reclaim rate module 706 adjusts 1012 a prospective capacity reclaim rate to correspond to the target capacity reclaim rate and satisfy the write bandwidth. The capacity panic module 708 determines 1014 if a remaining storage capacity of the solid-state storage device 102 satisfies a panic threshold. If the remaining storage capacity does not satisfy the panic threshold, the method 1000 repeats. If the remaining storage capacity satisfies the panic threshold, the capacity panic module 708 temporarily halts 1016 workload write operations in order to prevent the data storage device 102 from running out of available storage capacity, while storage capacity recovery operations continue. The method 1000 repeats.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining a write bandwidth for a sequential log-based data storage device, wherein the write bandwidth includes workload write operations that modify previously stored data, the write bandwidth indicative of a rate at which workload write operations use storage space;
   determining a target reclaim rate for the data storage device, the target reclaim rate satisfying the write bandwidth for the data storage device;
   determining a current reclaim rate for the data storage device, based on the write bandwidth, to correspond to the target reclaim rate; and
   reclaiming storage blocks of the data storage device at the current reclaim rate.

2. The method of claim 1, wherein determining the current reclaim rate for the data storage device comprises determining an adjustment to a past reclaim rate for the data storage device in a direction of the target reclaim rate.

3. The method of claim 1, further comprising,
   determining a past reclaim rate for the data storage device, wherein the past reclaim rate is indicative of a rate at which storage space is reclaimed during one or more previous reclamation periods; and
   adjusting the current reclaim rate for the data storage device in response to the determined past reclaim rate failing to satisfy the write bandwidth.

4. The method of claim 1, wherein the target reclaim rate satisfies the write bandwidth for the data storage device by being greater than or equal to the write bandwidth in response to a user capacity for the data storage device reaching a maximum user capacity for the data storage device.

5. The method of claim 1, wherein the target reclaim rate is indicative of a target reclamation write rate determined using the write bandwidth and an invalid data ratio for one or more reclamation regions of the data storage device.

6. The method of claim 1, further comprising:
   halting workload writes temporarily in response to one or more of the target reclaim rate exceeding a reclaim rate threshold and a remaining storage space of the data storage device satisfying a panic threshold.

7. The method of claim 1, further comprising:
   suspending a reclamation operation associated with the current reclaim rate in response to a remaining storage space of the data storage device satisfying a high capacity threshold.

8. The method of claim 1, wherein a sequential log-based writing structure of the data storage device comprises an append point; and
   wherein the method further comprises:
      writing workload data to the append point; and
      subsequently writing reclamation data to the append point.

9. A non-transitory computer readable medium having program instructions stored thereon, wherein the program instructions are executable by a computer system to cause the computer system to perform operations comprising:

determining a write bandwidth for a sequential log-based data storage device, wherein the write bandwidth includes workload write operations that modify previously stored data, the write bandwidth indicative of a rate at which workload write operations use storage space;

determining a target reclaim rate for the data storage device, the target reclaim rate satisfying the write bandwidth for the data storage device;

determining a current reclaim rate for the data storage device, based on the write bandwidth, to correspond to the target reclaim rate; and reclaiming storage blocks of the data storage device at the current reclaim rate.

10. The computer readable medium of claim 9, wherein determining the current reclaim rate for the data storage device comprises determining an adjustment to a past reclaim rate for the data storage device in a direction of the target reclaim rate.

11. The computer readable medium of claim 9, wherein the operations further comprise:

determining a past reclaim rate for the data storage device, wherein the past reclaim rate is indicative of a rate at which storage space is reclaimed during one or more previous reclamation periods; and adjusting the current reclaim rate for the data storage device in response to the determined past reclaim rate failing to satisfy the write bandwidth.

12. The computer readable medium of claim 9, wherein the target reclaim rate satisfies the write bandwidth for the data storage device by being greater than or equal to the write bandwidth in response to a user capacity for the data storage device reaching a maximum user capacity for the data storage device.

13. The computer readable medium of claim 9, wherein the target reclaim rate is indicative of a target reclamation write rate determined using the write bandwidth and an invalid data ratio for one or more reclamation regions of the data storage device.

14. The computer readable medium of claim 9, wherein the operations further comprise:

halting workload writes temporarily in response to one or more of the target reclaim rate exceeding a reclaim rate threshold and a remaining storage space of the data storage device satisfying a panic threshold.

15. The computer readable medium of claim 9, wherein the operations further comprise:

suspending a reclamation operation associated with the current reclaim rate in response to a remaining storage space of the data storage device satisfying a high capacity threshold.

16. The computer readable medium of claim 9, wherein a sequential log-based writing structure of the data storage device comprises an append point; and wherein the operations further comprise:

writing workload data to the append point; and subsequently writing reclamation data to the append point.

* * * * *